US008797354B2

(12) United States Patent
Noge

(10) Patent No.: US 8,797,354 B2
(45) Date of Patent: Aug. 5, 2014

(54) COMPUTER-READABLE STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

(75) Inventor: Tetsuya Noge, Kai (JP)

(73) Assignees: Nintendo Co., Ltd., Kyoto (JP); Hal Laboratory, Toyko (JP)

( * ) Notice: Subject to any disclaimer, the term of this patent is extended or adjusted under 35 U.S.C. 154(b) by 315 days.

(21) Appl. No.: 13/159,767

(22) Filed: Jun. 14, 2011

(65) Prior Publication Data

US 2012/0176409 A1 Jul. 12, 2012

(30) Foreign Application Priority Data

Jan. 6, 2011 (JP) ................................. 2011-001486

(51) Int. Cl.
*G09G 5/00* (2006.01)
*H04N 13/04* (2006.01)
*H04N 13/00* (2006.01)
*A63F 13/10* (2006.01)

(52) U.S. Cl.
CPC ............ *A63F 13/10* (2013.01); *H04N 13/0454* (2013.01); *A63F 2300/8035* (2013.01); *A63F 2300/69* (2013.01); *H04N 13/0022* (2013.01); *H04N 13/0409* (2013.01)
USPC ............................. 345/633; 382/164; 382/165

(58) Field of Classification Search
None
See application file for complete search history.

(56) References Cited

U.S. PATENT DOCUMENTS

| 6,266,100 | B1 * | 7/2001 | Gloudemans et al. | 348/587 |
|---|---|---|---|---|
| 7,035,435 | B2 * | 4/2006 | Li et al. | 382/107 |
| 7,391,424 | B2 * | 6/2008 | Lonsing | 345/633 |
| 7,853,075 | B2 * | 12/2010 | Mattausch et al. | 382/164 |
| 2006/0159370 | A1 * | 7/2006 | Tanaka et al. | 382/305 |
| 2009/0110241 | A1 * | 4/2009 | Takemoto et al. | 382/103 |
| 2010/0034420 | A1 * | 2/2010 | Xiong et al. | 382/100 |

FOREIGN PATENT DOCUMENTS

JP   2008-113746   5/2008

OTHER PUBLICATIONS

Foley (J. D. Foley, A. vanDam, S. K. Feiner, J. F. Hughes, Computer Graphics—Principles and Practice, pp. 590-593, Addison-Wesley, 1996).*

* cited by examiner

*Primary Examiner* — Kee M Tung
*Assistant Examiner* — William Beutel
(74) *Attorney, Agent, or Firm* — Nixon & Vanderhye, P.C.

(57) ABSTRACT

A storage medium has stored therein an image processing program that causes a computer of an image processing apparatus, which is connected to a real camera for taking an image of a real space and a display device that allows the real space to be viewed on a display area thereof, to operate as real space image obtaining means, specific object detection means, calculation means, setting means, identification means, event providing means, virtual space image generation means, and display control means.

13 Claims, 14 Drawing Sheets

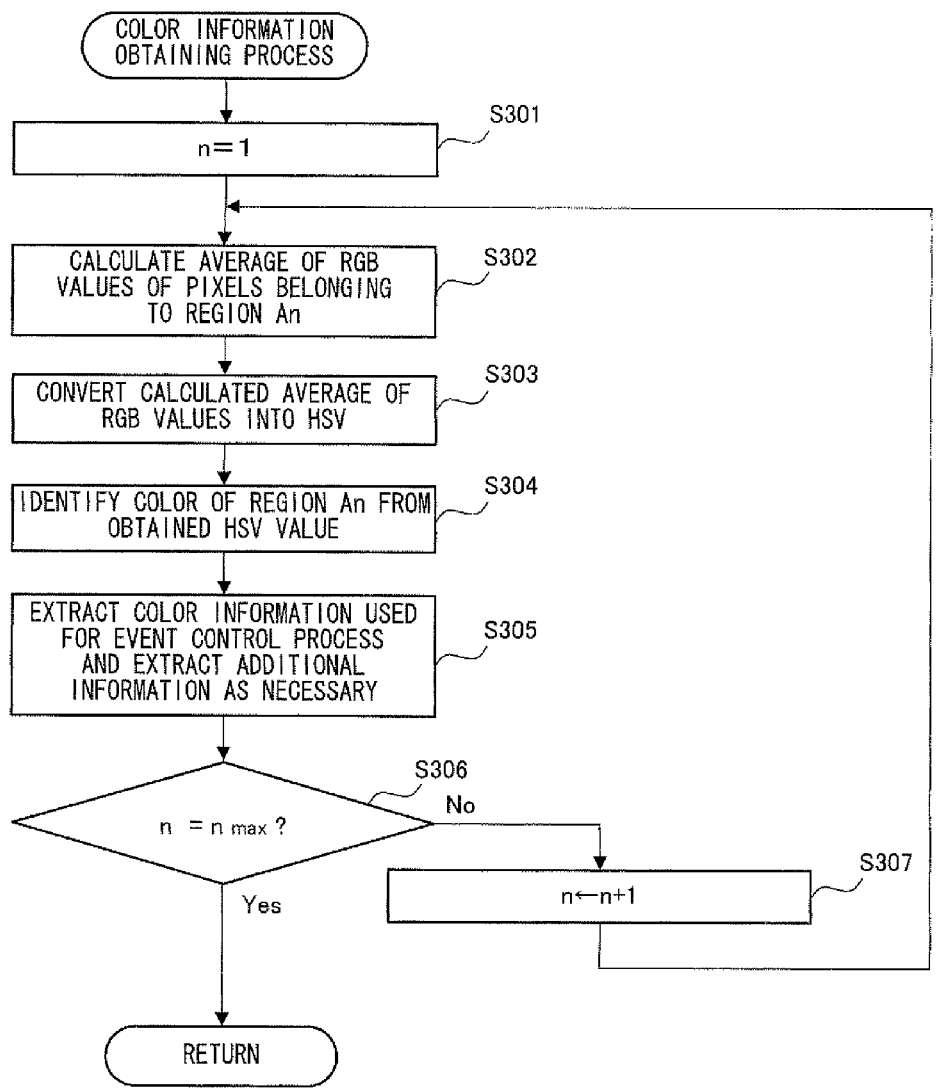

F I G. 7
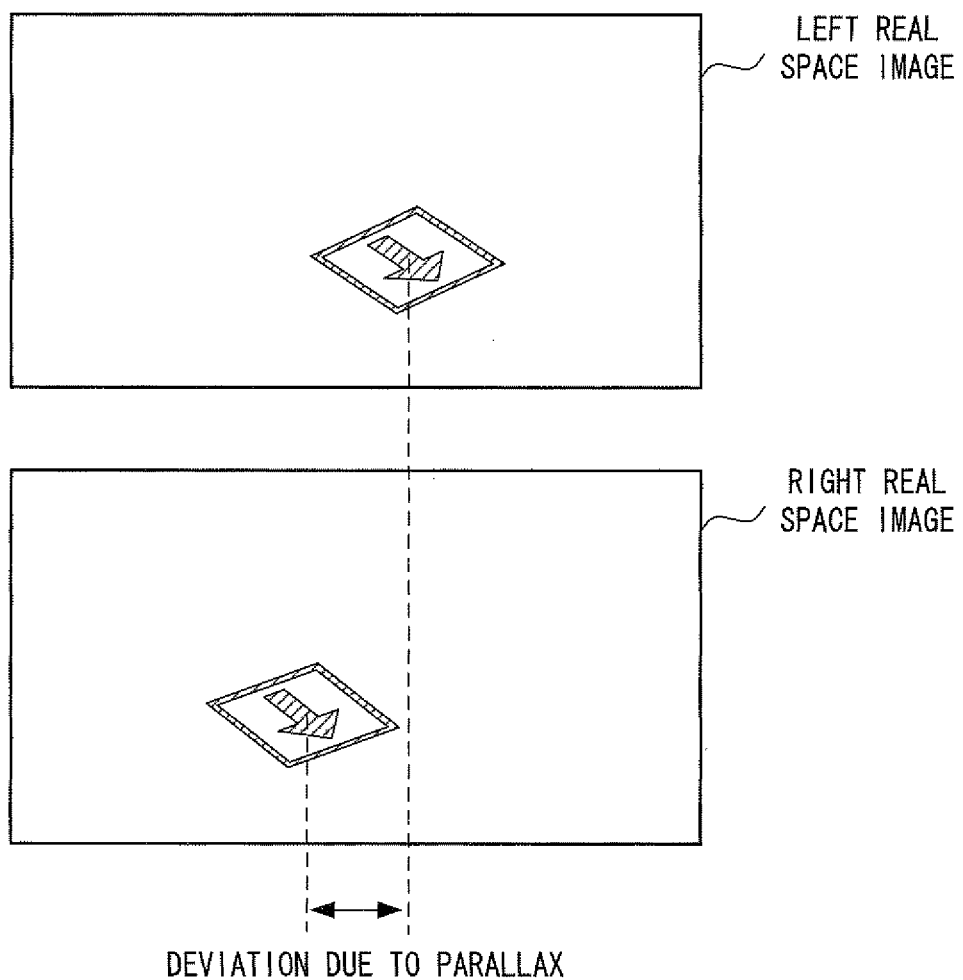

ORIGIN OF LEFT VIRTUAL
CAMERA COORDINATE SYSTEM

ORIGIN OF MARKER
COORDINATE SYSTEM

ORIGIN OF RIGHT
VIRTUAL CAMERA
COORDINATE SYSTEM

ORIGIN OF MARKER
COORDINATE SYSTEM

COMPUTER-READABLE STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2011-001486, filed on Jan. 6, 2011, is incorporated herein by reference.

BACKGROUND OF THE INVENTION

1. Field of the Invention

The present invention relates to a computer-readable storage medium having an image processing program stored therein, an image processing apparatus, an image processing system, and an image processing method, and more specifically, relates to a computer-readable storage medium having an image processing program stored therein, an image processing apparatus, an image processing system, and an image processing method, which set a virtual object by using a real space image and perform image processing.

2. Description of the Background Art

Conventionally, an apparatus that displays an image in which a real space image and a virtual space image are superimposed on each other is proposed (for example, see Japanese Laid-Open Patent Publication No. 2008-113746 (hereinafter, referred to as Patent Document 1)). A game apparatus disclosed in Patent Document 1 displays an image taken by an external camera, as a background image such that the image is superimposed on a game image. Specifically, the game apparatus updates the background image at regular time intervals and displays the latest background image such that the latest background image is superimposed on the game image.

However, the game apparatus disclosed in Patent Document 1 merely displays the image taken by the external camera, as the background image in such a state that the superimposed background image and the game image are not relevant to each other. Thus, the displayed image itself is monotonous, and an amusing image cannot be provided to a user.

SUMMARY OF THE INVENTION

Therefore, it is an object of the present invention to provide an computer-readable storage medium having an image processing program stored therein, an image processing apparatus, an image processing system, and an image processing method, which can set a new image by using a real space image and can perform image processing.

In order to attain the object mentioned above, the present invention can be provided, as an example, in the following aspects. The following specific description is in all aspects illustrative for the understanding of the extent of the present invention, and is not intended to be limited thereto. That is, it is understood that, from the specific description, the one skilled in the art can implement the present invention in the equivalent range based on the description of the present invention and on the common technological knowledge.

In one aspect, the present invention can provide a computer-readable storage medium having an image processing program stored therein. The image processing program causes a computer of an image processing apparatus, which is connected to a real camera for taking an image of a real space and a display device that allows the real space to be viewed on a display area thereof, to operate as real space image obtaining means, specific object detection means, calculation means, setting means, identification means, event providing means, virtual space image generation means, and display control means.

The real space image obtaining means obtains an image of the real space taken as a real space image by the real camera. The specific object detection means detects a specific object from the real space image. The calculation means performs at least calculation of a relative position between the real camera and the specific object on the basis of a result of detection of the specific object by the specific object detection means. The setting means sets a virtual camera in a virtual space on the basis of the relative position. The identification means identifies, from pixels that constitute a portion of the real space image other than a portion thereof corresponding to the specific object, a pixel that satisfies a predetermined color condition defined on the basis of a color component of the constituting pixels or a combination thereof. The event providing means provides a predetermined event corresponding to the predetermined color condition, in the virtual space in accordance with a result of identifying the pixel that satisfies the predetermined color condition. The virtual space image generation means generates a virtual space image by taking, by the virtual camera, an image of the virtual space in which the event is provided. The display control means displays the virtual space image on the display device such that the virtual space image is superimposed on the real space on the display area and viewed on the display area.

As used herein, the term "color space" refers to a specific format (model) for describing colors as a specific number (typically, it is 3 or 4 but not limited thereto) of tuples. Here, a tuple is an ordered set of elements (e.g., values or color components).

As used herein, the term "color system" is a system that quantitatively represents colors in accordance with a psychological concept or a psychophysical concept, and constitutes a color space. Examples of color systems includes, but are not limited to, for example, the RGB color system, the XYZ color system, the xyY color system, the L*u*v* color system, the L*a*b* color system, the Munsell color system, the HSV (HSB) color system, the Ostwald color system, the NCS (Natural Color System), and the DIN color system.

As used herein, the term "color component" or "element constituting a color space" refers to an element (e.g., a value or color component) for describing a color system constituting the color space. For example, the RGB color system is a color system having primary colors that are R (red, the wavelength is around 700 nm), G (green, the wavelength is around 546.1 nm), and B (blue, the wavelength is around 435.8 nm), and each of R, G, and B can be a "color component" or an "element constituting a color space". Further, in another example, the HSV color system is a color system using three color attributes, hue (H), brightness (V), and saturation (S), and each of hue, brightness, and saturation can be a "color component" or an "element constituting a color space". Thus, in each color system, an optional color in the color system is provided by defining a relationship satisfied by color components.

As used herein, the term "specific object" is an object present in the real space, and serves as a reference for positioning when information such as an image representing a virtual space including any virtual object is additionally shown in the real space (or an image representing the real space).

Examples of specific objects include a visual marker having a geometric characteristic (hereinafter, referred to as marker), an object having a predetermined three-dimensional shape characteristic, and an object that provides a predetermined characteristic point when being imaged. Here, the marker is not limited to one provided in the form of a printed matter (e.g., including a card and a book as well as one formed from a material other than paper) or in the form of an article for daily use that can display a geometric shape on its surface, and may be provided in the form of an image displayed on a display device such as a liquid crystal display. Further, the geometric characteristic embodied in the marker does not necessarily need to be viewed with human naked eyes, and may be viewed by using an apparatus for detection or the like as appropriate. Examples of such a marker include a marker produced from a transparent retroreflecting material (a special material that reflects incident light in a direction toward the light source). For example, the marker produced from the retroreflecting material is observed as a transparent object with human naked eyes, but its characteristic can be recognized when an image of the marker is taken by an infrared camera.

As used herein, the term "event" is an action during information processing (particularly, game processing and image processing). Typical examples of the "event" include, but are not limited to, locating a virtual object in a virtual space and/or displaying the virtual object on a display area (providing the virtual object in the virtual space), deleting the virtual object in the virtual space or from the display area (disappearance of the virtual object), changing the display form of the virtual object (e.g., changing the shape of a three-dimensional model corresponding to the virtual object, changing a texture to be rendered), and changing a representation method (e.g., changing an environment in a virtual space (e.g., a state of representing a wind blowing in the virtual space), changing a sound/a sound effect, and changing a method of illumination).

As used herein, a state where an apparatus or system "connects (is connected)" to another apparatus or system is not limited to a state of being connected by a line, and can include a state of being wirelessly connected.

In another embodiment, a region within the real space image which region is targeted by the identification means for identifying the pixel that satisfies the predetermined color condition may be a region defined on the basis of a relative positional relation with the portion corresponding to the specific object.

In another embodiment, a region within the real space image which region is targeted by the identification means for identifying the pixel that satisfies the predetermined color condition may be a portion corresponding to a region near the specific object in the real space. As used herein, the term "region near the specific object" is a region that is included in the real space image including the specific object when the real space image is obtained and the specific object is located at such a position, on the real space image, that the shape characteristic of the specific object is sufficiently recognized, and of which the position can be determined on the basis of the specific object. Further, such a "region near the specific object" is, in a typical example, a region of which the position can be determined on the basis of the contour of the specific object (e.g., a marker).

In another embodiment, area region within the real space image which region is targeted by the identification means for identifying the pixel that satisfies the predetermined color condition may include a plurality of subregions, the identification means may perform a process of identifying the pixel that satisfies the predetermined color condition, for each of the subregions, and the event providing means may provide the predetermined event in the virtual space in accordance with a combination of results of the identifying process that are obtained for the subregions, respectively.

In another embodiment, the event providing means may provide the predetermined event in the virtual space when a substantially same result of the process of identifying the pixel that satisfies the predetermined color condition is obtained for at least two subregions of the plurality of subregions.

In another embodiment, the event providing means may provide, in the virtual space, the predetermined event corresponding to: a result of identifying the pixel that satisfies the predetermined color condition for each of the plurality of subregions; and position information of each of the plurality of subregions.

The event providing means may provide the predetermined event in the virtual space when a state where the identification means identifies the pixel that satisfies the predetermined color condition continues for a predetermined time.

After the event providing means provides the predetermined event in the virtual space, the predetermined event may be deleted from the virtual space when a state where the identification means does not identify the pixel that satisfies the predetermined color condition continues for a predetermined time.

The identification means may convert RGB color model-based color information of the portion of the real space image other than the portion thereof corresponding to the specific object, into HSV color model-based color information before identifying a pixel that satisfies a predetermined color condition, from pixels that constitute the portion of the real space image other than the portion thereof corresponding to the specific object; and then the identification means may identify the pixel as being in the predetermined color condition when the result of indentifying a pixel on the basis of converted information based on the HSV color model agrees with a corresponding result of identification only based on the ROB color model-based color information.

The predetermined event may be an event of providing a predetermined object in the virtual space.

When providing the object, the object to be provided in the virtual space may be selected from a plurality of objects in accordance with a color component of the identified pixel or a combination thereof.

In addition, in another aspect, the computer-readable storage medium, described above, having the image processing program stored therein may be used as an apparatus executing the image processing program, or as a system including one or more apparatuses that can communicate with each other. Further, the present invention includes a method that can be implemented in the computer-readable storage medium having the image processing program stored therein, the apparatus, or the system.

As used herein, the term "computer-readable storage medium" indicates any apparatus or medium capable of storing a program, a code, and/or data to be used in a computer system. The computer-readable storage medium may be any one of a volatile device and a nonvolatile device as long as it can be read by a computer system. Examples of computer-readable storage media include a magnetic tape, a hard disc drive (HDD), a compact disc (CD), a digital versatile disc (DVD), a flu-ray disc (BD), a semiconductor memory, but the present invention is not limited thereto.

As used herein, the term "system" (for example, a game system, or an information processing system) may include one apparatus, or may include a plurality of apparatuses each of which can communicate with another one of the apparatuses.

The storage medium and the like according to the present invention can provide more extension of representation as a game than ever to enhance fun.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6C is a flowchart illustrating an example of a color information obtaining process performed in FIG. 6B;

FIG. 7 is a diagram illustrating an example of a left real space image and a right real space image;

DESCRIPTION OF THE PREFERRED EMBODIMENTS

Example of Structure of Game Apparatus

Figure 1:
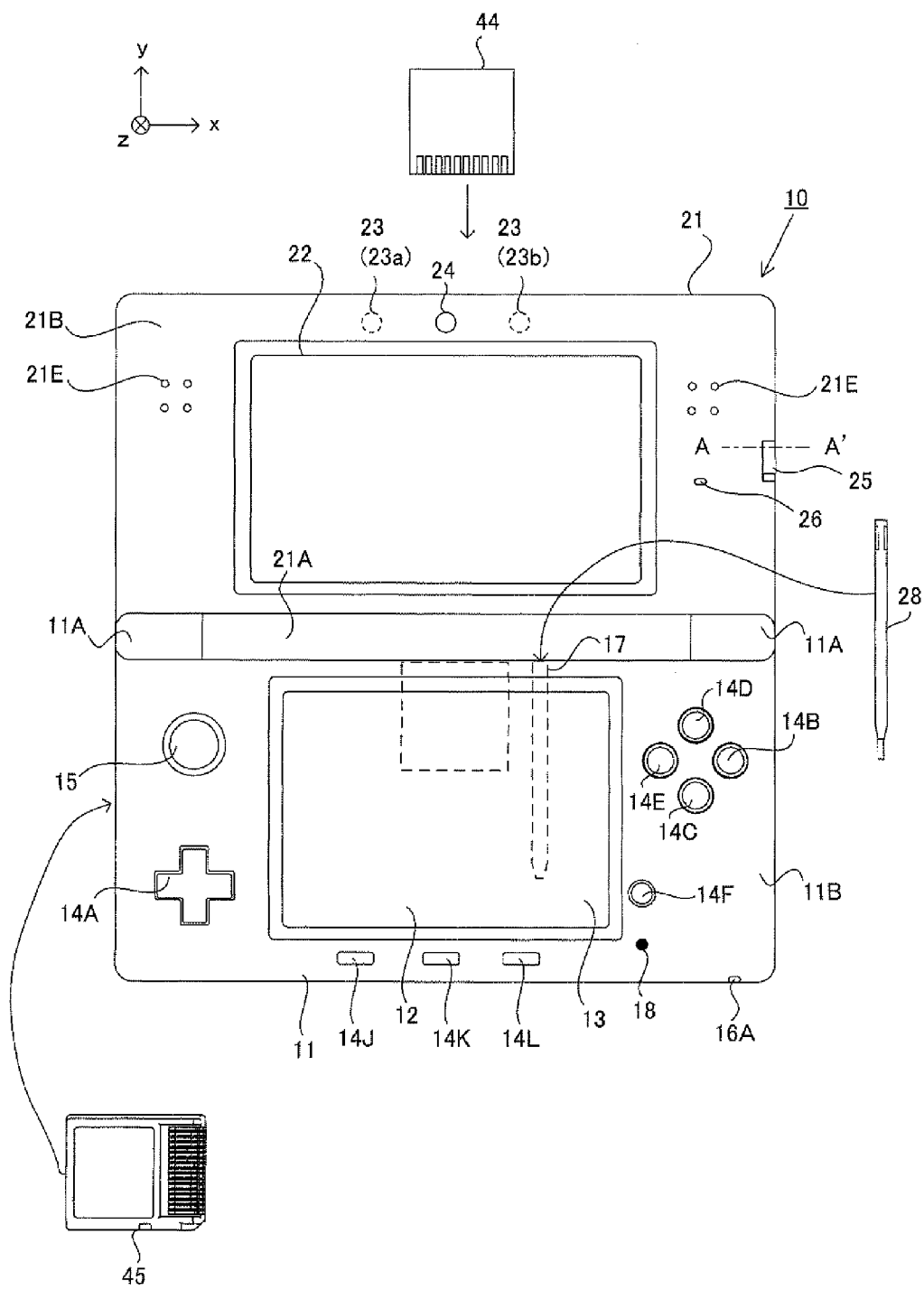
FIG. 1 is a front view of a game apparatus 10 in an opened state.
Figure 2:
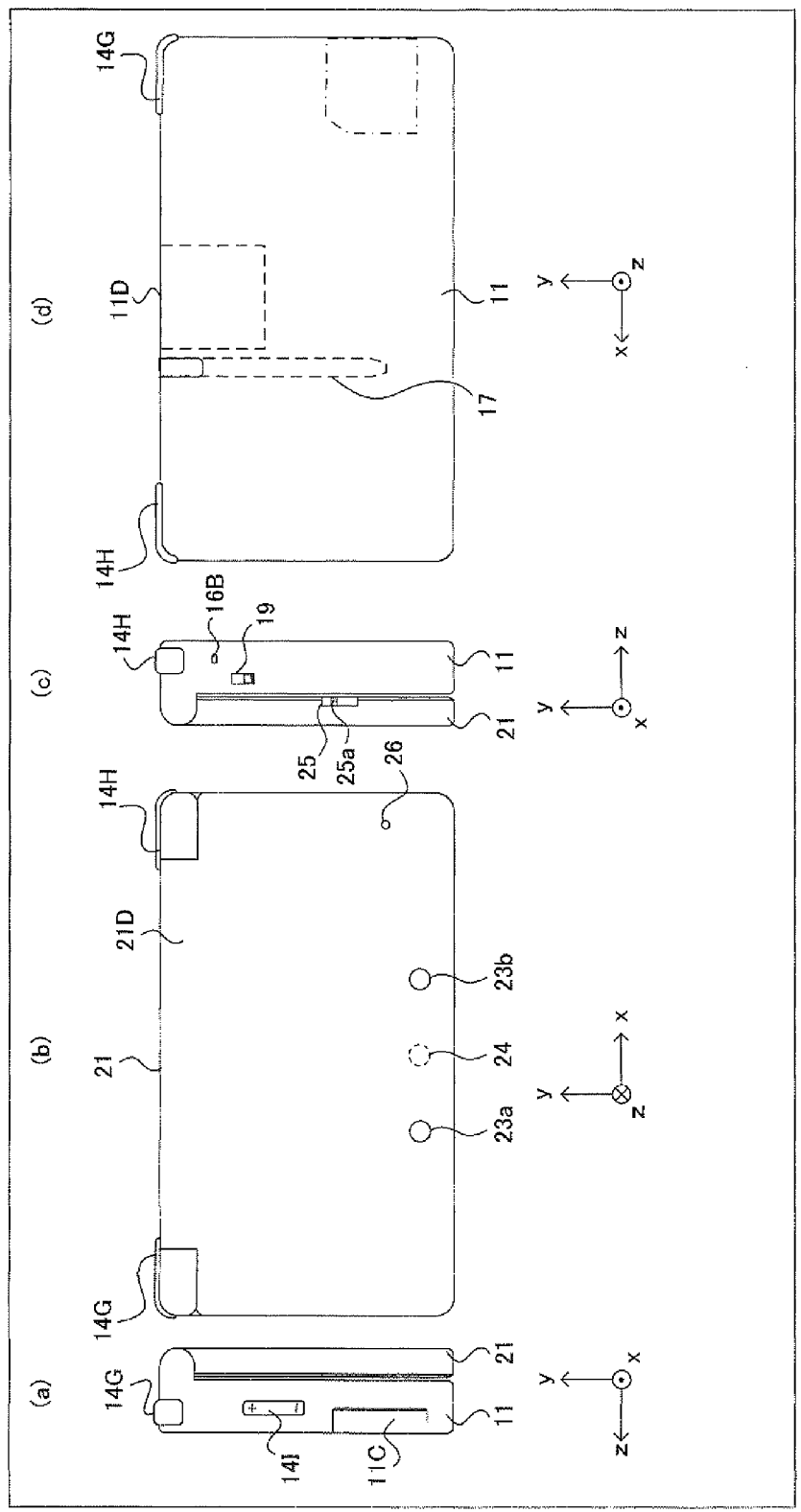
FIG. 2 is a left side view, a front view, a right side view, and a rear view of the game apparatus 10 in a closed state.

Hereinafter, a game apparatus according to one exemplified embodiment of the present invention will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an detachable memory card (e.g., a below-described external memory 44) or a game program which is received from a server or another game apparatus or stored in a built-in storage area (e.g., a below-described internal data storage memory 35), and can display, on the screen, an image generated by computer graphics processing, such as an image taken by a virtual camera set in a virtual space, for example.

Initially, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

Description of Lower Housing

Initially, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIG. 2(b) and FIG. 2(d), an L button 14G and an R button 14H are provided on the upper side surface of the lower housing 11 The L button 14G and the R button 14H can act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which the external memory 44 having the game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

Description of Upper Housing

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be configured to be lit up only when the upper LCD 22 is in the stereoscopic display mode and program processing for displaying a stereoscopic image is performed.

Further, a speaker hole 21E is provided on the inner side surface of the upper housing 21. A sound is outputted through the speaker hole 21E from a speaker 43 described below.

Internal Configuration of Game Apparatus 10

Figure 3:
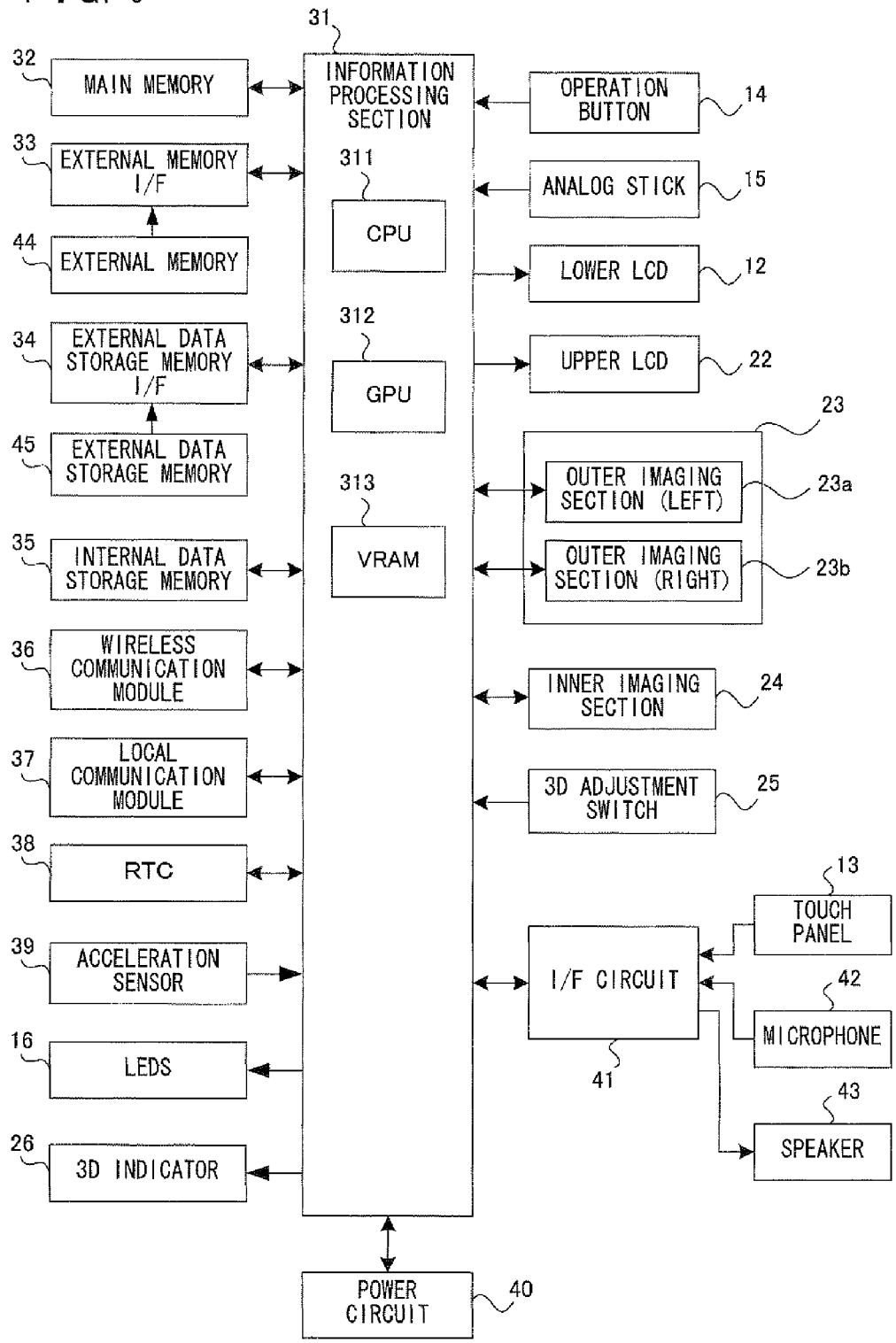
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, the internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing corresponding to the program (e.g., photographing processing and below-described game processing). The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311, and renders the image in the VRAM 313. The GPU 312 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program obtained from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the PF circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 obtains the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image of a real space in accordance with an instruction from the information processing section 31 and output image data of the real space to the information processing section 31. When a taken image is displayed in real time on the upper LCD 22 or the lower LCD 12 or when image processing such as color recognition or face recognition is performed, each of the outer imaging section 23 and the inner imaging section 24 is configured to take an image of the real space at predetermined time intervals and output the image date to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

Outline of Operation of Game Apparatus 10

Hereinafter, an outline of an operation of the game apparatus 10 in the present embodiment will be described. In the present embodiment, on the basis of a game program 70 (see a memory map in FIG. 5), a synthesized image in which an image of the real space being currently taken by the outer imaging section 23 (the outer imaging section (left) 23a and the outer imaging section (right) 23b) is synthesized with an image of a virtual object present in a three-dimensional virtual space, is displayed on the screen of the upper LCD 22 such that the synthesized image is stereoscopically visible.

Figure 4A:
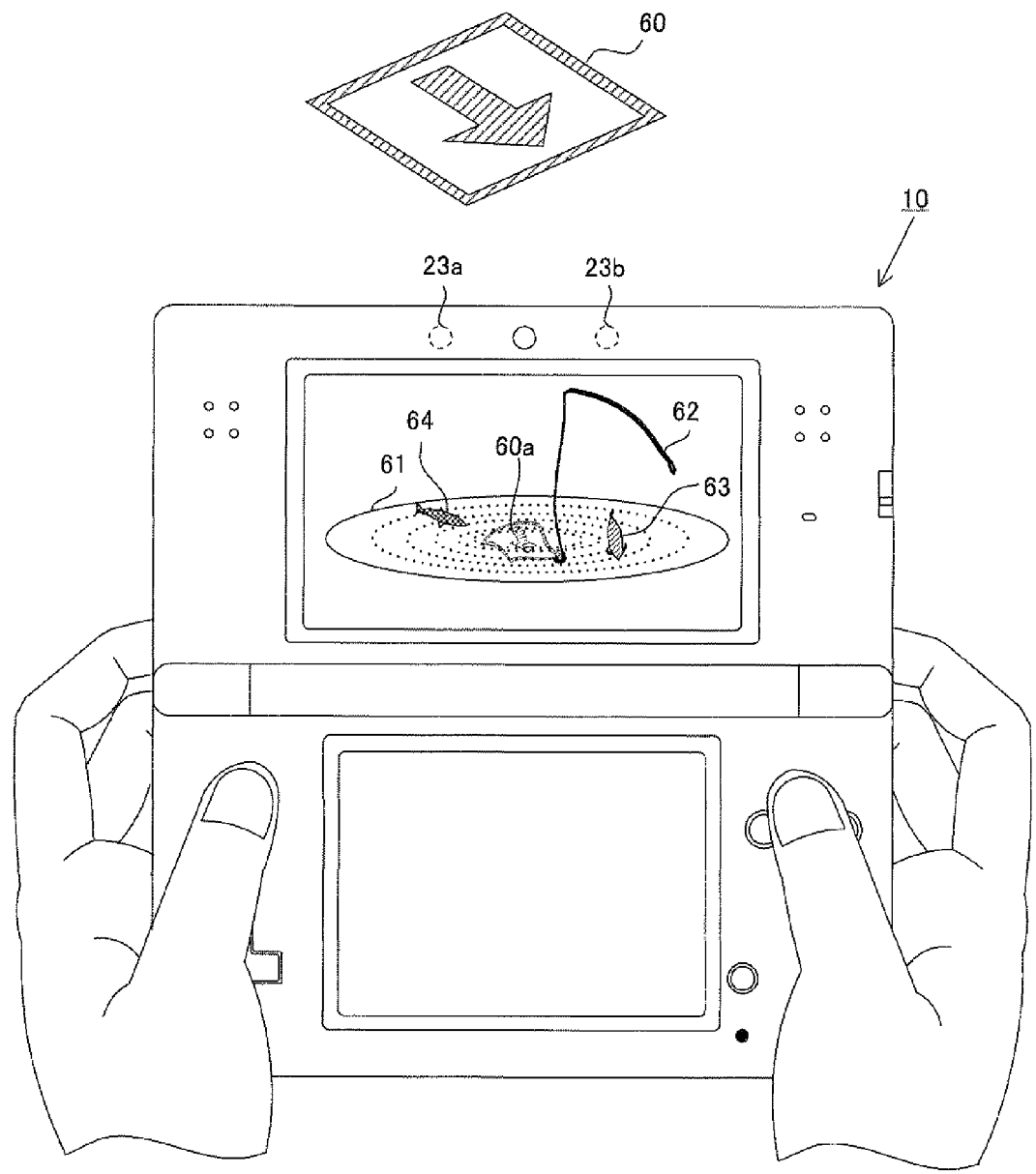
FIG. 4A is a diagram illustrating an example of an image displayed on a screen of an upper LCD 22 when an image of a marker 60 is taken by an outer imaging section 23.

FIG. 4A is a diagram illustrating an example of an image obtained during game processing provided in the game apparatus 10. Specifically, FIG. 4A is a diagram illustrating an example of an image displayed on the upper LCD 22 when an image of a visual marker (hereinafter, referred to as marker) 60 is taken by the outer imaging section 23.

In an exemplified embodiment, the present invention provides game processing to which a series of augmented reality technique and the like are applied. Here, an outline of a flow of the exemplified game processing will be described with reference to FIG. 4A etc. In particular, in a series of the game processing, the exemplified game apparatus 10 provides novel image processing by using color information of an image of the real space that is taken by the outer imaging section 23. In the following, a specific embodiment where image processing is performed by using the color information will be described with a description of an entire flow of a game mounted in the game apparatus 10.

As shown in FIG. 4A, the marker 60 has, on its surface, a square pattern including an arrow like pattern. The information processing section 31 can determine whether or not an image (real space image) obtained from the outer imaging section 23 includes the marker, by performing image processing (e.g., pattern matching) on the real space image. In addition, on the basis of the position and the orientation of the recognized marker 60, a marker coordinate system (a coordinate system having an origin at a predetermined point in a virtual space corresponding to the position of the marker 60 in the real space) is defined.

Next, on the basis of the position and the orientation of the marker 60 and information calculated from the position and the like, the information processing section 31 displays a plurality of virtual objects (e.g., a fishing rod object 62) on the upper LCD 22 such that the virtual objects are stereoscopically visible. Here, in order to appropriately combine the real space image and an image of a virtual space (a virtual space image), which is generated during the game processing, to extend/enhance perception information received from the real environment, a real space corresponding to the real space image including the marker 60 and a virtual space corresponding to the virtual space image need to be appropriately superimposed on each other.

Initially, the information processing section 31 causes a reference point in the real space to correspond to a reference point in the virtual space on the basis of the position of the marker 60 located in the real space. Next, the information processing section 31 sets a virtual camera in the virtual space such that the virtual camera has the same position and orientation as those of the outer imaging section 23 that takes an image of the real space. Then, the information processing section 31 causes the properties (e.g., parameters such as lens distortion, focal length, and an angle of view) of the virtual camera to agree with those of the outer imaging section 23 as necessary. In this manner, the real space corresponding to the real space image including the marker 60 and the virtual space corresponding to the virtual space image are appropriately superimposed on each other.

Figure 4B:
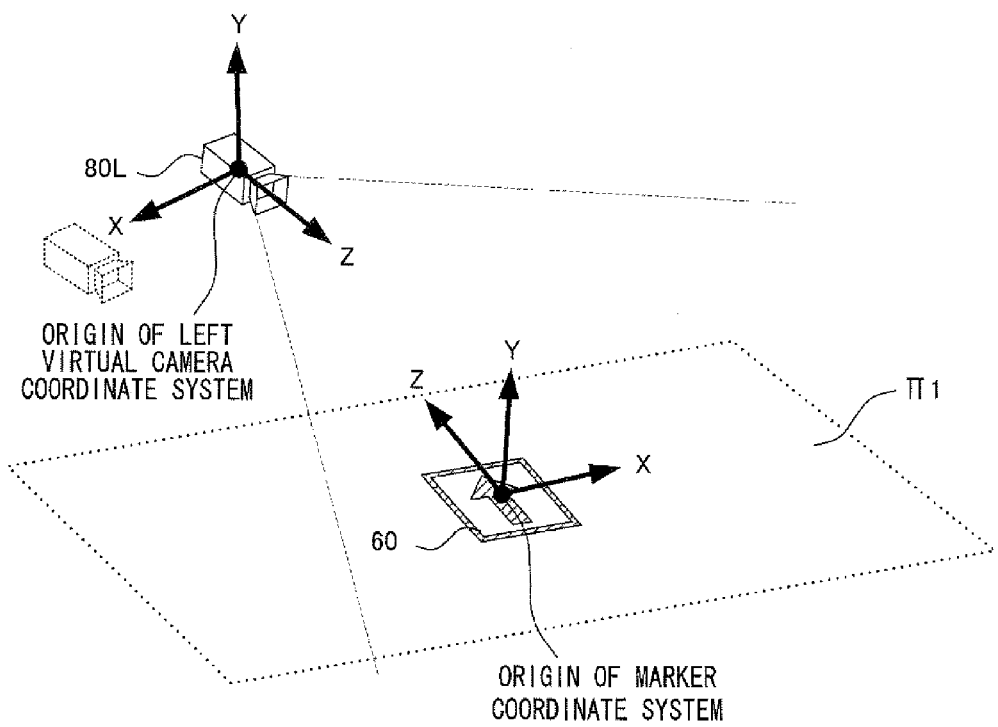
FIG. 4B is a diagram schematically illustrating an example of a relative position of a virtual camera with respect to the marker 60.

As one of the virtual objects located in the virtual space, a virtual object 61 that has a certain surface area and that represents a water surface (hereinafter, referred to as water surface object 61) is located substantially in parallel to and on a plane that includes the marker 60 (a plane $\pi 1$ in FIG. 4B). The water surface object 61 is a model representing an interface between the atmosphere and a large amount of water (e.g., a pond or sea), and serves as a virtual surface defined in the virtual space. FIG. 4A illustrates a resultant displayed combination of the marker 60 (60a in the combination) included in the real world image and the virtual objects. F.

In the exemplified embodiment, the model for representing the water surface object 61 is not a complete plane but a three-dimensional model having a wavy curved surface for representing a surface wave (a mechanical wave traveling along the interface between different media). The curved surface may deform at predetermined time intervals in accordance with a progress of a game.

The surface of the model that defines the water surface object 61 serves as a virtual surface in the virtual space, and the virtual surface can separate the virtual space into some subspaces. For example, in the present embodiment, the surface of the three-dimensional model for the water surface object 61 or a main surface of the water surface object 61 (a plane obtained by performing average approximation of recesses and projections of the model; e.g., the above plane $\pi 1$) can be defined as a virtual surface that separates the virtual space into a space "on the water" and a space "in the water". Here, when the main surface is assumed to be extended to infinity, the virtual space is separated into two spaces by the main surface. Of the two virtual spaces obtained by the separation, a space where the virtual camera is present can be defined as the space "on the water", and the other space can be defined as the space "in the water". The main surface of the water surface object 61 is actually defined as a region having a certain surface area, and thus the game processing is performed on the assumption of a limitation by the region.

It should be noted that a mode in which the virtual surface shown here is defined is intended to be illustrative, and the virtual surface in the present invention should not be limited to this example. In addition, the water surface object 61 may not be necessarily located in parallel to or on the plane including the marker 60, and it suffices that the water surface object 61 is located at such a position that a representation that is appropriate for a progress of the game can be ensured.

A virtual object 62, which represents a fishing rod having a fishing hook and a fishing line (hereinafter, referred to as fishing rod object 62), is located in the space "on the water" so as to be closer to the virtual camera than the water surface object 61. The fishing rod object 62 serves as a player object that is controllable by a user (player). The user moves the holding game apparatus 10 relative to the marker 60, the position of the virtual camera is updated in accordance with the movement, and the displayed positions of the virtual objects are also updated. The fishing rod object 62 is updated so as to be located in front of the virtual camera in the virtual space. Thus, the user can receive a feeling as if the holding game apparatus 10 is connected to the fishing rod object 62 in the virtual space. The fishing rod object 62 includes a portion 62a representing a fishing rod body (hereinafter, referred to as fishing rod body 62a), a portion 62b corresponding to the fishing line (hereinafter, referred to as fishing line portion 62b), and a portion 62c corresponding to the fishing hook (hereinafter, referred to as fishing hook portion 62c) (see FIG. 4D).

By the user performing an operation including movement of the game apparatus 10 relative to the marker 60, the fishing hook portion 62c of the fishing rod object 62 can be cast into a region under the water surface object 61 (that is, the space "in the water"). By so doing, the game provided by the game apparatus 10 progresses.

In the fishing game, the user casts the fishing hook portion 62c, aiming at fish indications projected on the water surface object 61 (indicated by reference characters 63 and 64 in FIG. 4A). The fish indications are a part of a representation image for suggesting that objects representing fish (hereinafter, referred to as fish objects) are present in the space "in the water" (one subspace in the virtual space). Meanwhile, the fishing rod object 62, which is controllable by the user, is located in the space "on the water" (a subspace, in the virtual space, which is different from the space "in the water").

In other words, during the progress of the game, the user controls the fishing rod object 62 by performing an operation of moving the game apparatus 10 relative to the marker 60, thereby establishing a certain correlation of the fishing rod object 62 with the fish objects located in the subspace different from the space in which the fishing rod object 62 is located.

When a certain pulling-up condition is satisfied while the game progresses, the user can pull a fish object corresponding to the fish indication, out of the water. Although the series of game processing will be described in more detail below ("processing according to a first embodiment"), a feeling felt by an angler during actual fishing can be more realistically reproduced by the present embodiment.

In other words, a feeling can be provided to the user as if the fishing rod object 62 is actually connected to the game apparatus 10 held by the user for operations and the fishing line portion 62b is dropped from the fishing rod object 62 into the water surface object 61 that is spatially integrated with the real space. Thus, an immersed feeling and a reality feeling of the user can be enhanced.

As described above, on a display area provided by the game apparatus 10, the real space and the virtual space are appropriately superimposed on each other on the basis of the marker 60, whereby the user enjoys an effect in which information on the real space is enhanced. In the exemplified embodiment, the game apparatus 10 identifies a pixel (or a group of pixels) having color information that satisfies a predetermined condition, from an image other than a portion corresponding to the marker 60 among an image obtained by taking an image of the real space, and provides a predetermined event that is previously associated with the condition. Thus, the user enjoys a further enhanced effect from the game apparatus 10.

Figure 4C:
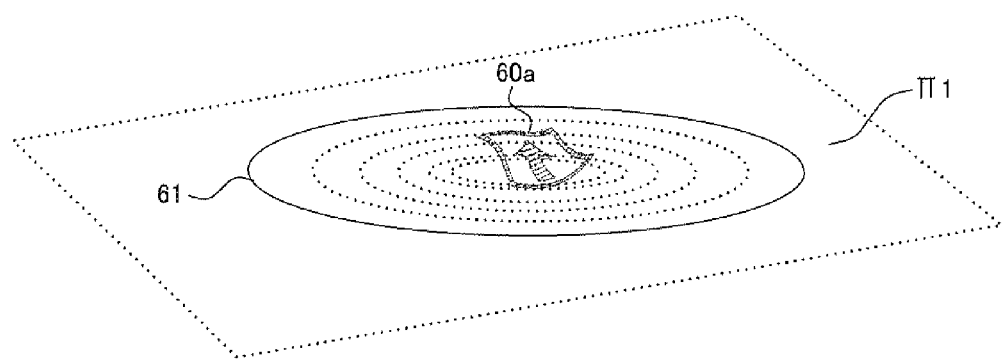
FIG. 4C is a diagram illustrating an example of a water surface object 61 located in a virtual space.
Figure 4D:
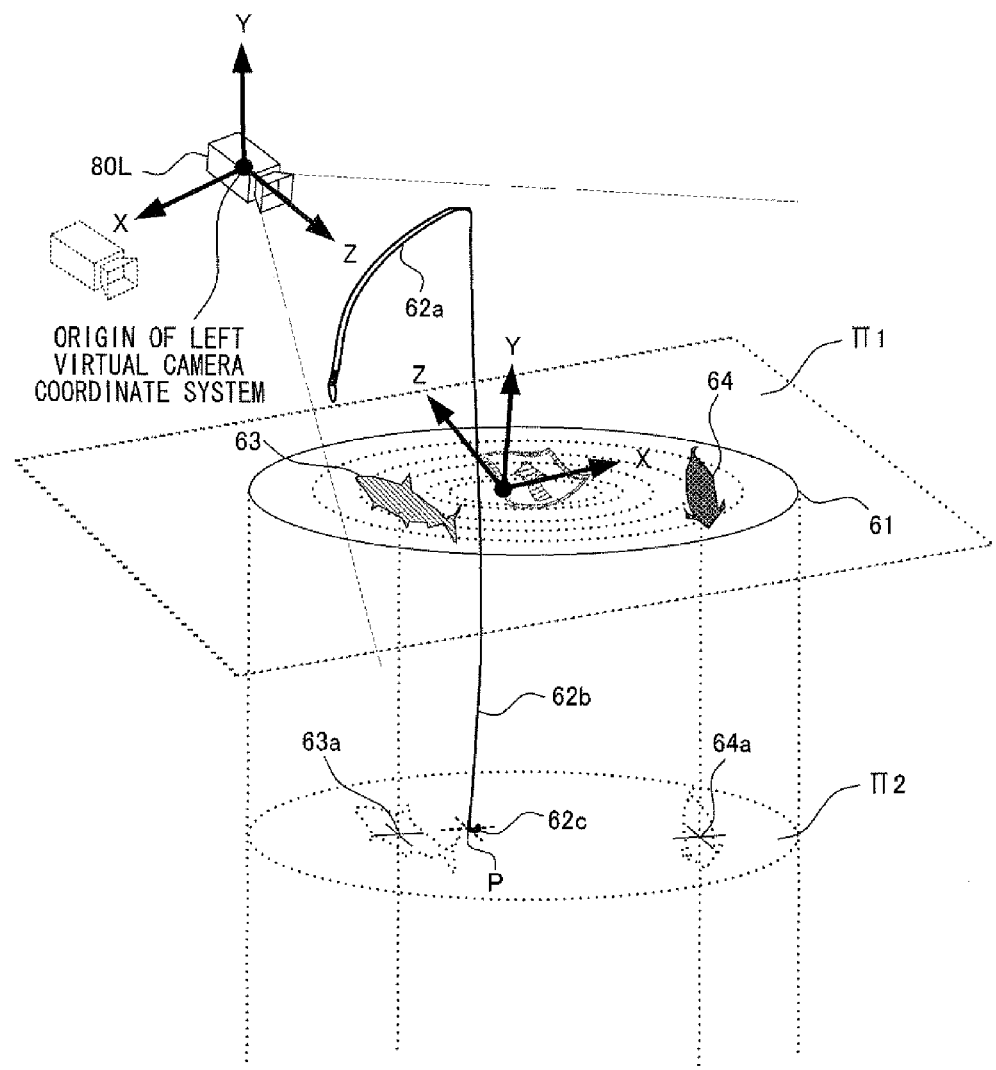
FIG. 4D is a diagram illustrating exemplified positional relations among virtual objects and the like in the virtual space.
Figure 4E:
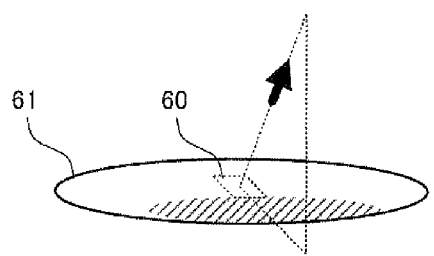
FIG. 4E is a diagram illustrating an example of a mode in which a region (a shaded portion in the drawing) where fish indications appear is limited.
Figure 4F:
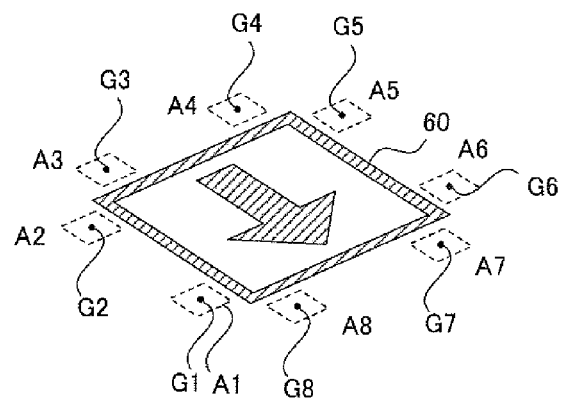
FIG. 4F is a diagram schematically illustrating a group of points a relative position of each of which with respect to the marker 60 satisfies a predetermined relation, and regions defined by using the respective points as representative points.

FIG. 4F is a diagram schematically illustrating a group of points (Gn; n=1 to 8) a relative position of each of which with respect to the marker 60 used in the game described above satisfies a predetermined relation, and regions (An; n=1 to 8) defined by using the respective points as representative points. It should be noted that the range of "n" is intended to be illustrative, and a number in another range may be used. Each representative point is a point at a predetermined position on the real space image which position is defined on the basis of the position of the marker 60. Each region An is defined as a region having a predetermined surface area (e.g., the surface area corresponding to one pixel or the surface area of a region composed of a group of pixels) at a position where a representative point Gn is defined. Further, the shape of this region is a square (e.g., a group of pixels such as 2×2, 4×4, or 8×8 pixels) as one example, and may be any geometrical shape. The method of arranging the representative points Gn is arbitrary. In the example shown in FIG. 4F, eight representative points Gn are arranged along the edge of the marker 60 so as to be spaced apart from the marker 60 by a regular distance, and two of them are located along each side of the marker 60 that is rectangular.

Figure 4G:
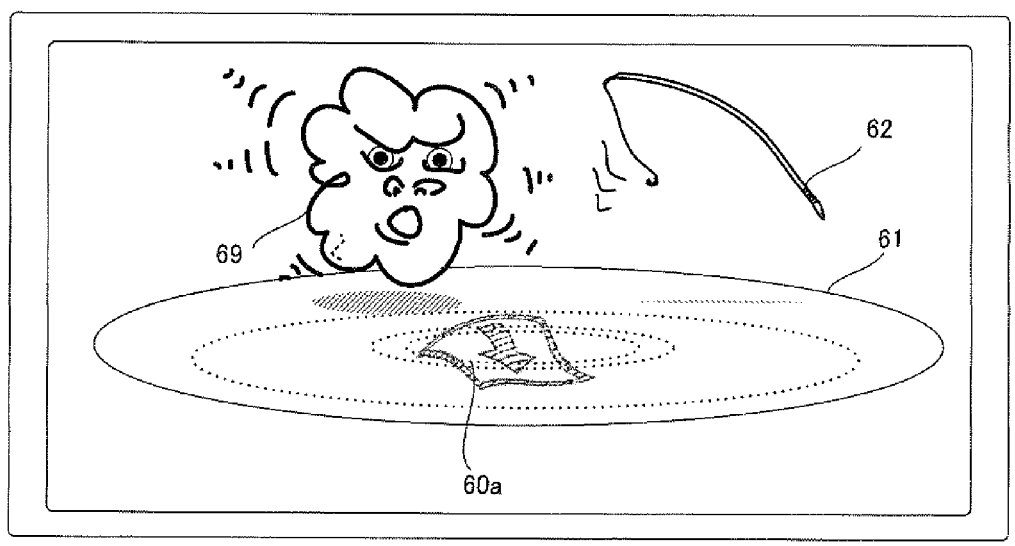
FIG. 4G is a schematic diagram illustrating an example where the game apparatus 10 causes an event in which a virtual object appears to occur in accordance with a result of a color identification process.

When taking an image of the marker 60, the game apparatus 10 identifies color information of the regions (An) defined around the marker 60. Then, depending on a combination of the color information identified at the regions (An), the game apparatus 10 provides a predetermined event during the game processing. An exemplified event is an event in which a predetermined object is provided in the virtual space. In a more specific example, when color information defined as "red color" is identified at any two of the regions An, an image indicating a virtual space including a predetermined virtual object corresponding to the color information (e.g., a virtual object 69 in FIG. 4G) is displayed on the display area of the game apparatus 10. Here, FIG. 4G is a schematic diagram illustrating an example where the game apparatus 10 causes an event in which a virtual object appears to occur in accordance with a result of a color identification process. The method of identifying color information, a criterion, and the like will be described in detail below. In this manner, in the present embodiment, the game apparatus 10 provides a wide range of novel representation by reflecting color information of an object in the real space, in an event that occurs during the game processing.

Hereinafter, the game processing performed in the game apparatus 10 on the basis of the game program 70 will be described in more detail with reference to mainly FIG. 4A and the subsequent drawings. An image processing program according to the exemplified embodiment of the present invention is provided so as to serve as a part of functions of the game program 70. The image processing program may be present as a modularized program that is separable from the game program 70, or as an inseparable program that is integrated with the game program 70.

Memory Map

Figure 5:
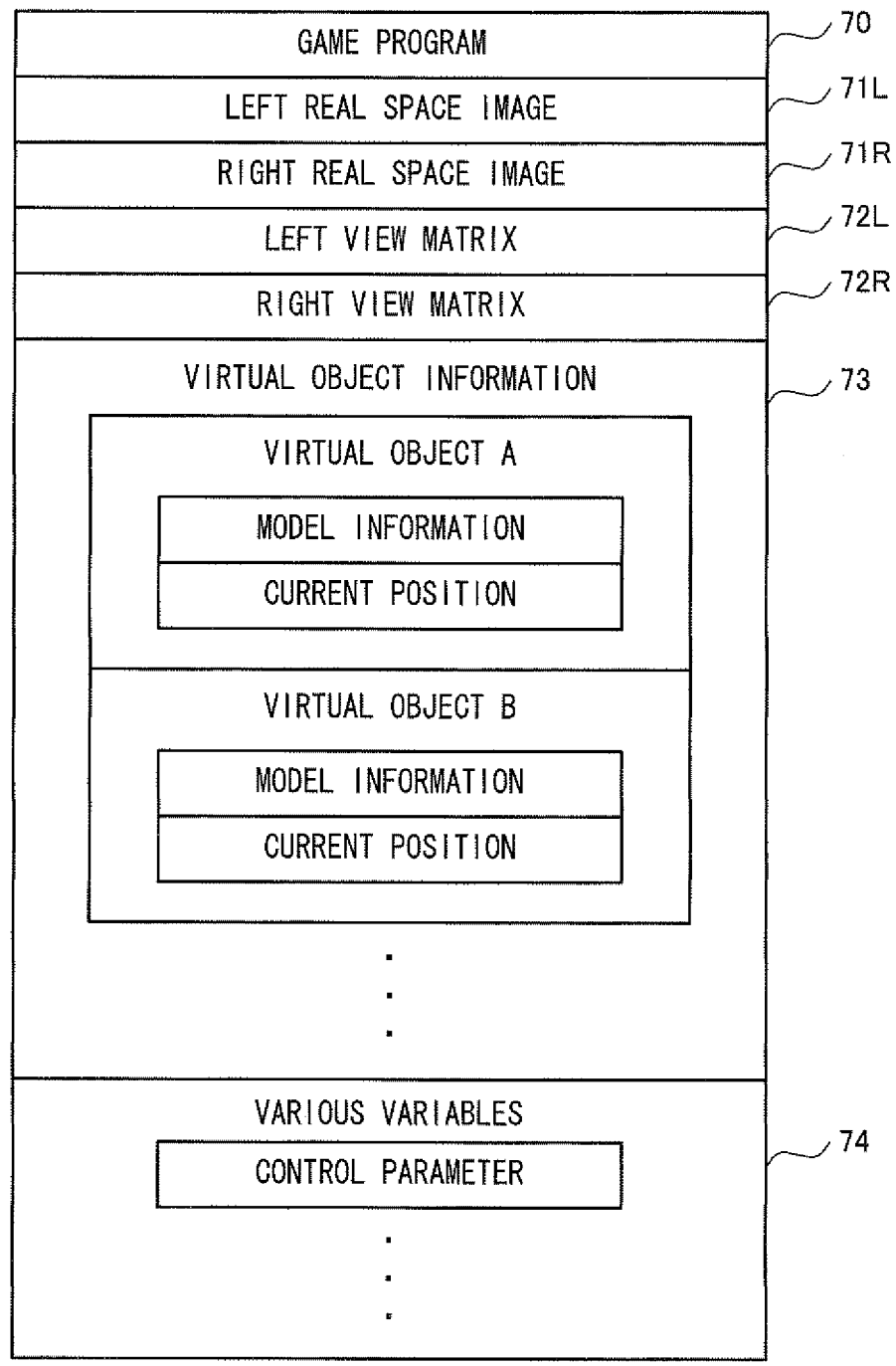
FIG. 5 is a diagram illustrating a memory map of a main memory 32 of the game apparatus 10.

Initially, main data that is stored in the main memory 32 during execution of the game program will be described. FIG. 5 is a diagram illustrating the memory map of the main memory 32 of the game apparatus 10. As shown in FIG. 5, the game program 70, a left real space image 71L, a right real space image 71R, a left view matrix 72L, a right view matrix 72R, virtual object information 73, various variables 74, and the like are stored in the main memory 32. The various variables include parameters used for a process concerning color information in an image appearing during processing of the above image processing program, or temporary processing target data. Unless otherwise specified herein, each parameter is stored in the main memory 32 of the game apparatus 10 and can be reused. Alternatively, data indicating these parameters and the like may be stored in another storage area of the game apparatus 10 and may be reused by being read therefrom.

The game program 70 is a program for causing the information processing section 31 to performs the game processing.

The left real space image 71L is an image of the real space taken by the outer imaging section (left) 23a.

The right real space image 71R is an image of the real space taken by the outer imaging section (right) 23b.

The left view matrix 72L is used when rendering a virtual object that is viewed from a left virtual camera 80L, and is a coordinate transformation matrix for transforming a coordinate represented in the marker coordinate system into a coordinate represented in a left virtual camera coordinate system.

The right view matrix 72R is used when rendering a virtual object that is viewed from a right virtual camera 80R, and is a coordinate transformation matrix for transforming a coordinate represented in the marker coordinate system into a coordinate represented in a right virtual camera coordinate system.

The virtual object information 73 is information on virtual objects and includes model information representing the shapes and patterns of the virtual objects, current positions of the virtual objects in the virtual space, and the like.

The various variables 74 are used when the game program 70 is executed.

When the game apparatus 10 is powered on, the information processing section 31 (the CPU 311) of the game apparatus 10 executes a boot program stored in a ROM (not shown), thereby initializing each unit such as the main memory 32. Next, the game program stored in the internal data storage memory 35 is loaded into the main memory 32, and execution of the game program is started by the CPU 311 of the information processing section 31.

Figure 6A:
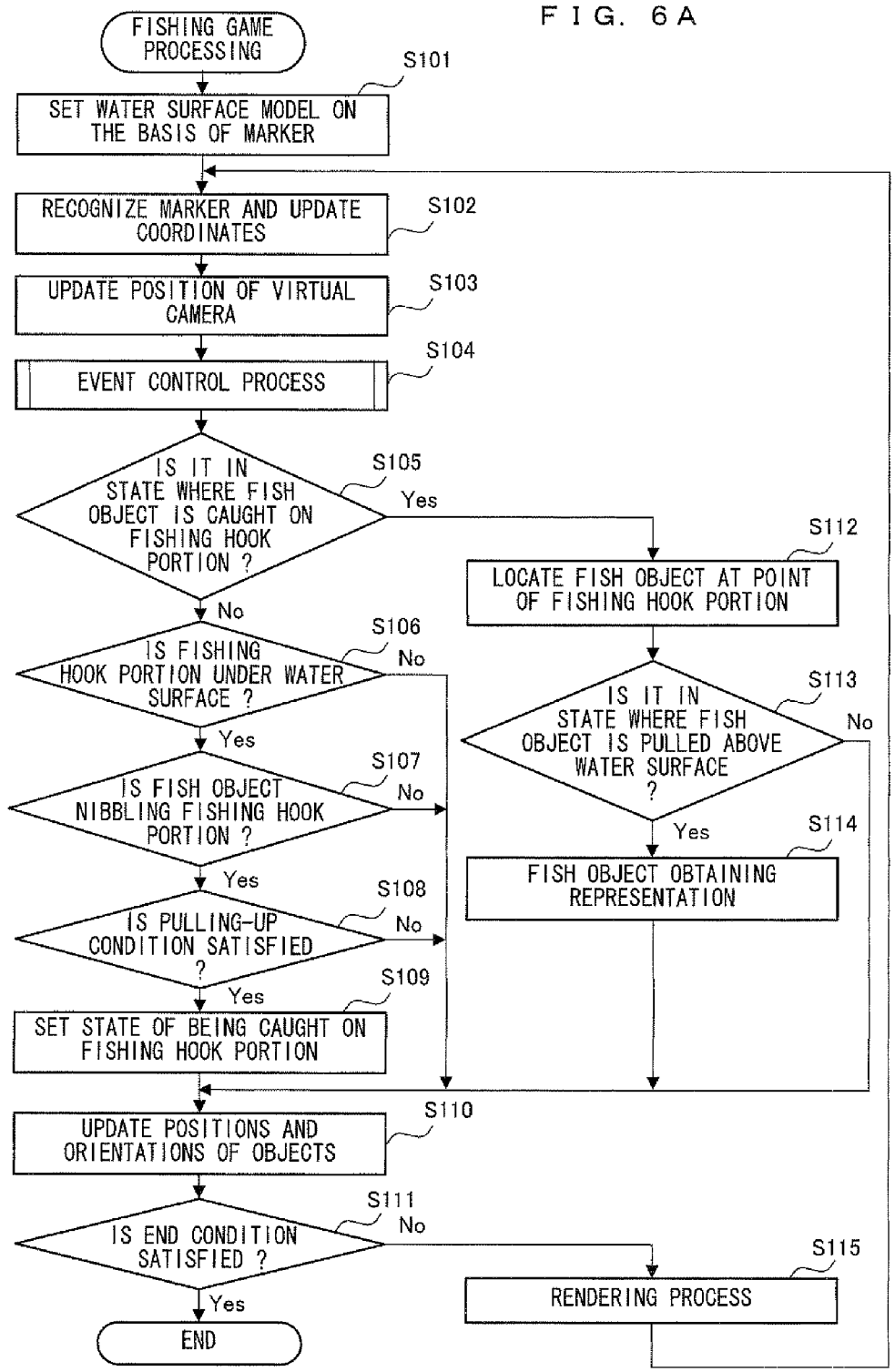
FIG. 6A is a flowchart illustrating an example of a flow of game processing performed by a CPU 311 on the basis of a game program 70.
Figure 6B:
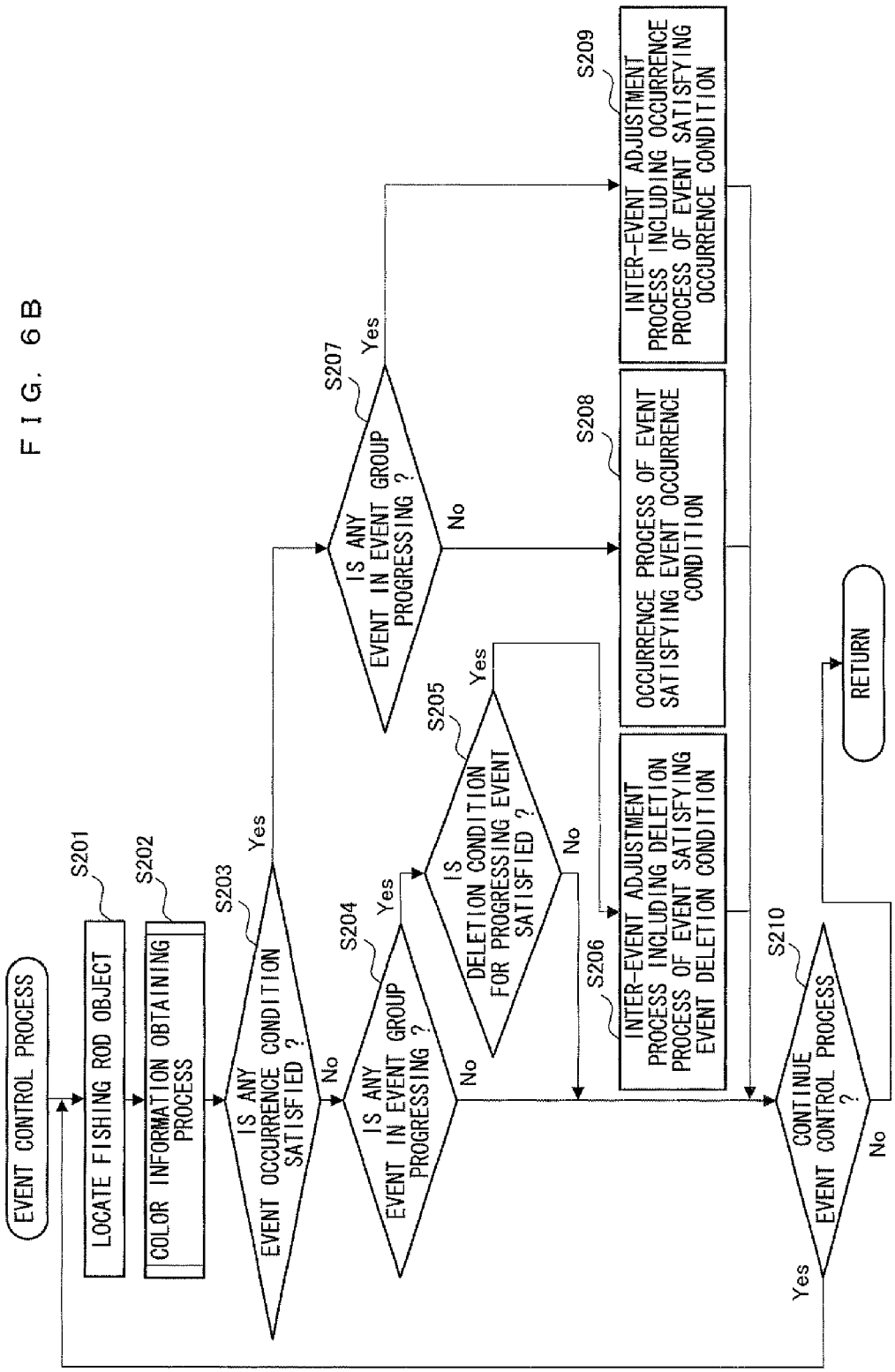
FIG. 6B is a flowchart illustrating an example of an event control process performed in the processing of the flowchart in FIG. 6A.

Hereinafter, flows of the processing performed on the basis of the game program will be described with reference to flowcharts in FIGS. 6A to 6C. In FIGS. 6A to 6C, "step" is abbreviated as "5". It should be noted that the flowcharts in FIGS. 6A to 6C are merely examples. Therefore, the order of each process step may be changed as long as the same result is obtained. In addition, the values of the variables and thresholds used at determination steps are also merely examples, and other values may be used as necessary. Moreover, in the present embodiment, the CPU 311 performs processes at all steps in the flowcharts in FIGS. 6A to 6C. However, a processor or a dedicated circuit other than the CPU 311 may perform processes at some of the steps in the flowcharts in FIGS. 6A to 6C.

FIG. 6A is a flowchart illustrating a flow of the game processing performed by the CPU 311 on the basis of the game program 70 (processing corresponding to a first embodiment).

FIG. 6B is a flowchart illustrating an example of an event control process performed in the processing of the flowchart in FIG. 6A. FIG. 6C is a flowchart illustrating an example of a color information obtaining process performed in FIG. 6B;

Processing According to First Embodiment: Fishing Game

Specifically, FIG. 6A illustrates exemplified processing according to a game that incorporates elements of fishing in the real world into the progress of the game. Hereinafter, details of the game processing will be described.

At step 101 in FIG. 6A, the CPU 311 sets the water surface object 61 on the basis of information of the position and the like of the marker 60 that is recognized on the basis of an image taken by the outer imaging section 23 of the game apparatus 10.

In the present embodiment, the CPU 311 causes coordinates in the virtual space to correspond to absolute coordinates in the real space (e.g., coordinates in the marker coordinate system) on the basis of the marker 60. The CPU 311 sets a predetermined position in the marker 60 recognized by pattern matching or the like, as the origin of the marker coordinate system (FIG. 413). FIG. 4B is a diagram schematically illustrating a relative position of the virtual, camera (the left virtual camera SOL is indicated by a solid line and the right virtual camera 80R is indicated by a dotted line in this drawing) and the marker 60. The process of recognizing the marker, which is performed here, is the same in principle as a part of a process concerning marker recognition and update at subsequent step 102.

Next, the CPU 311 sets the virtual camera such that the virtual camera has the same position and orientation with respect to the marker 60, which is a reference point, as those of the outer imaging section 23 that takes an image of the real space. Then, the CPU 311 causes the properties (e.g., parameters such as lens distortion, focal length, and an angle of view) of the virtual camera to agree with those of the outer imaging section 23 as necessary. In this manner, the real space corresponding to the real space image including the marker 60 and the virtual space corresponding to the virtual space image are appropriately superimposed on each other. The setting of the virtual camera, which is performed here, is the same in principle as a part of a process of updating the position of the virtual camera at subsequent step 103.

Next, the CPU 311 locates the water surface object 61 in the virtual space such that the water surface object 61 is parallel to the plane $\pi 1$ including the marker 60 (see FIG. 4C). FIG. 4C illustrates an example of the water surface object 61 located in the virtual space. Here, the CPU 311 performs mapping of an image taken by the outer imaging section 23 to the surface of the three-dimensional model (e.g., a model of a polygon) indicating the water surface object 61. In addition, the CPU 311 performs mapping of a taken image of the real space including the marker 60 to a representation of the three-dimensional model for the water surface object 61.

As described above, after the virtual camera in the virtual space is set at a position corresponding to the outer imaging section 23 (real camera) with respect to the marker 60, the CPU 311 performs mapping of the above taken image to the three-dimensional model (polygon) indicating the water surface object 61. Thus, it is possible to generate a superimposed image that is viewed by the user as if the water surface appears in the real space. Incidentally, by the mapping being performed, the taken image follows the shape of the three-dimensional model for the water surface object 61 and is viewed such that a part thereof is deformed (e.g., the marker 60 becomes a form indicated by 60a in FIG. 4C).

At step 102, the CPU 311 performs a recognition process of the marker 60 on the basis of the image obtained by the outer imaging section 23, and updates the coordinates in the marker coordinate system.

At step 103, the CPU 311 updates the position and the orientation of the virtual camera on the basis of the updated coordinates calculated at step 102. Although described below, the update of the position and the orientation of the virtual camera is performed by the CPU 311 calculating a view matrix (a matrix in which the position and the orientation of the virtual camera that are calculated on the basis of the position and the orientation of the marker in the real space image are reflected). In addition, similarly to step 101, the CPU 311 can cause the properties (e.g., parameters such as lens distortion, focal length, and an angle of view) of the virtual camera to agree with those of the outer imaging section 23 as necessary.

Hereinafter, details of the series of processes at steps 101 to 103 will be described. First, the marker recognition process performed at steps 101 and 102 will be described. It should be noted that the marker recognition process described here is described on the assumption that the game apparatus 10 provides a stereoscopically visible image to the user. When stereoscopic viewing is not required, one skilled in the art can specifically understand a marker recognition process performed in the case where stereoscopic viewing is not performed, from the following description.

As described above, in the upper housing 21, there is a certain interval (e.g., 3.5 cm) between the outer imaging section (left) 23a and the outer imaging section (right) 23b. Thus, when images of the marker 60 are simultaneously taken by the outer imaging section (left) 23a and the outer imaging section (right) 23b, the position and the orientation of the marker 60 in a left real space image taken by the outer imaging section (left) 23a are different from the position and the orientation of the marker 60 in a right real space image taken by the outer imaging section (right) 23b, as shown in FIG. 7, due to the parallax. The CPU 311 performs the marker recognition process on at least either one of the left real space image or the right real space image.

For example, when performing the marker recognition process on the left real space image, the CPU 311 determines whether or not the marker 60 is included in the left real space image, by using pattern matching or the like. When the marker 60 is included in the left real space image, the CPU 311 calculates a left view matrix 72L on the basis of the position and the orientation of the marker 60 in the left real space image. The left view matrix 72L is a matrix in which a position and an orientation of the left virtual camera that are calculated on the basis of the position and the orientation of the marker 60 in the left real space image are reflected.

Figure 8:
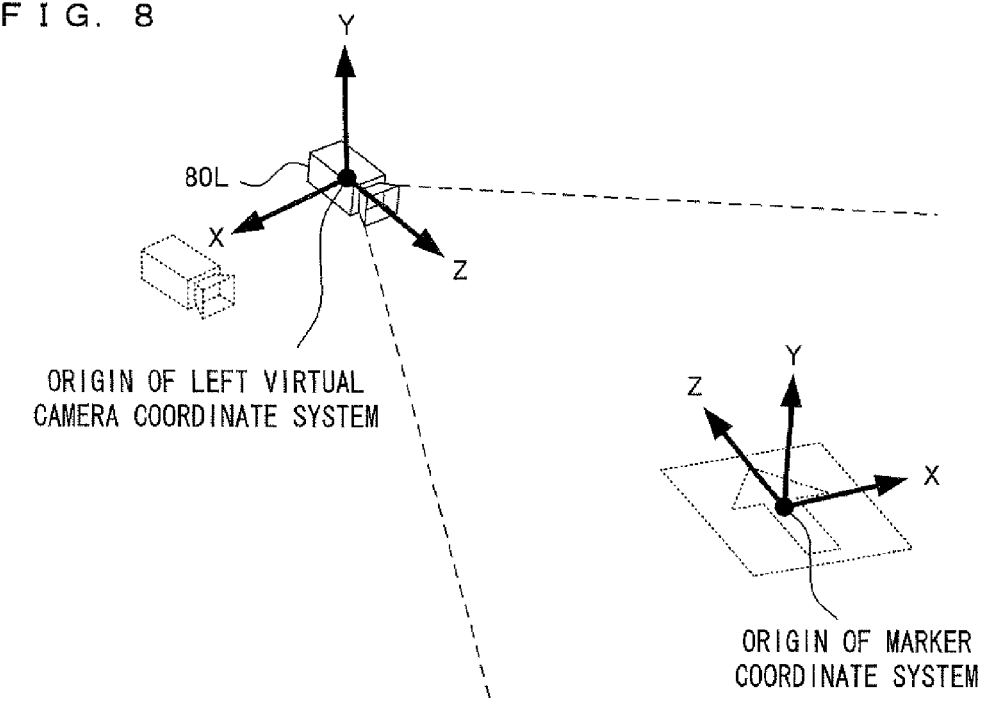
FIG. 8 is a diagram illustrating a position and an orientation of a left virtual camera 80L that are calculated in accordance with a result of a marker recognition process.

More precisely, as shown in FIG. 8, the left view matrix 72L is a coordinate transformation matrix for transforming a coordinate represented in the marker coordinate system in the virtual space (a coordinate system having an origin at a predetermined point in the virtual space corresponding to the position of the marker 60 in the real space) into a coordinate represented in a left virtual camera coordinate system based on the position and the orientation of the left virtual camera 80L (the virtual camera in the virtual space corresponding to the outer imaging section (left) 23a in the real space) that are calculated on the basis of the position and the orientation of the marker 60 in the left real space image.

Further, when performing the marker recognition process on the right real space image, the CPU 311 determines whether or not the marker 60 is included in the right real space image, by using pattern matching or the like. When the marker 60 is included in the right real space image, the CPU 311 calculates a right view matrix 72R on the basis of the position and the orientation of the marker 60 in the right real space image. The right view matrix 72R is a matrix in which a position and an orientation of the right virtual camera that are calculated on the basis of the position and the orientation of the marker 60 in the right real space image are reflected.

Figure 9:
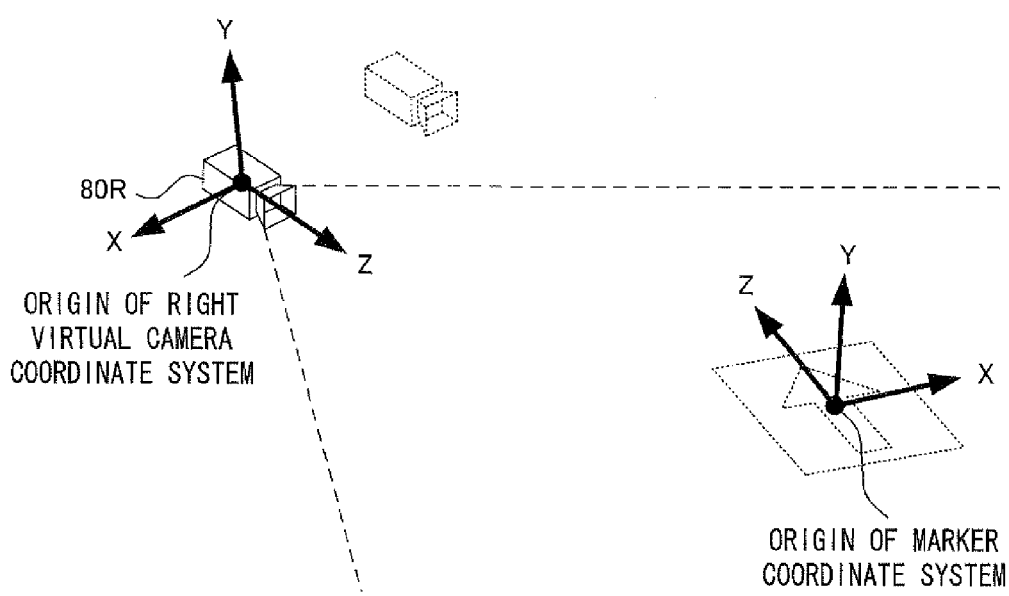
FIG. 9 is a diagram illustrating a position and an orientation of a right virtual camera 80R that are calculated in accordance with a result of the marker recognition process.

More precisely, as shown in FIG. 9, the right view matrix 72R is a coordinate transformation matrix for transforming a coordinate represented in the marker coordinate system in the virtual space (the coordinate system having the origin at the predetermined point in the virtual space corresponding to the position of the marker 60 in the real space) into a coordinate represented in a right virtual camera coordinate system based on the position and the orientation of the right virtual camera 80R (the virtual camera in the virtual space corresponding to the outer imaging section (right) 23b in the real space) that are calculated on the basis of the position and the orientation of the marker 60 in the right real space image.

When it is assumed that there are no errors in accuracy of the marker recognition and there are no errors in accuracy of mounting the outer imaging section (left) 23a and the outer imaging section (right) 23b to the game apparatus 10, the position of the right virtual camera SOR that is calculated from the marker recognition result of the right real space image is a position that is shifted from the position of the left virtual camera SOL that is calculated from the marker recognition result of the left real space image, along the x axis direction of the left virtual camera coordinate system by a certain distance. In addition, the orientation of the right virtual camera SOR that is calculated from the marker recognition result of the right real space image is the same as the orientation of the left virtual camera 80L that is calculated from the marker recognition result of the left real space image (that is, the x axis, the y axis, the z axis of the left virtual camera coordinate system are parallel to the x axis, the y axis, the z axis of the right virtual camera coordinate system, respectively).

Figure 10:
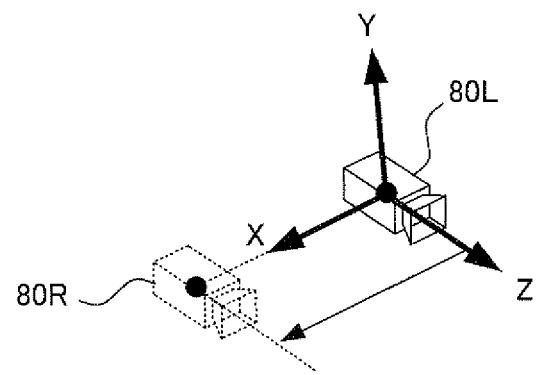
FIG. 10 is a diagram illustrating a position of the right virtual camera 80R that is set on the basis of a position and an orientation of the left virtual camera 80L.

However, since there are in reality some errors in accuracy of the marker recognition and accuracy of mounting the outer imaging section (left) 23a and the outer imaging section (right) 23b to the game apparatus 10, the position and the orientation that are calculated from the marker recognition result of the right real space image and the position and the orientation of the right virtual camera SOR that are calculated from the marker recognition result of the left real space image do not have an ideal relation (e.g., the left virtual camera SOL and the right virtual camera 80R are too close to each other or too distance from each other, and the orientation of the left virtual camera 80L and the orientation of the right virtual camera 80R are different from each other). Thus, when virtual objects are stereoscopically displayed on the upper LCD 22 by using the thus-calculated positions and orientations of the left virtual camera 80L and the right virtual camera 80R, the virtual objects may not be successfully stereoscopically viewed. Therefore, in the present embodiment, as an example, as shown in FIG. 10, the position and the orientation of the right virtual camera 80R are set on the basis of the position and the orientation of the left virtual camera 80L that are calculated from the marker recognition result of the left real space image.

At step 104, the CPU 311 performs the event control process. Specifically, the CPU 311 performs a series of processes as shown in FIG. 6B. An example of the event control process (steps 201 to 210) will be described in detail with reference to FIG. 6B.

At step 201, the CPU 311 locates the fishing rod object 62 at a predetermined position in the virtual space. The fishing rod object 62 includes the fishing rod body 62a, the fishing line portion 62b, and the fishing hook portion 62c. The fishing rod body 62a of the fishing rod object 62 is located, for example, on the near side of the water surface object 61 when viewed from the user operating the game apparatus 10, as shown in FIG. 4A. By the CPU 311 locating the fishing rod object 62 on the upper LCD 22 and at a position closer to the virtual camera (that is, the viewpoint of the user) than the water surface object 61, a feeling can be provided to the user as if the user holds a fishing rod and casts a fishing hook into the water spreading in front of the user, for example. The fishing rod object 62 is controllable by the user in the game processing. By operating the game apparatus 10, the user can extend the fishing line in the virtual space, cast the fishing hook portion 62c into a region indicated by the water surface object 61, and locate the fishing hook portion 62c in the virtual space in the water. Thus, at this step, the CPU 311 updates the position of the fishing hook portion 62c to a position corresponding to an operation performed by the user on the game apparatus 10.

At step 202, the CPU 311 performs the color information obtaining process. Specifically, the CPU 311 performs a color information obtaining process (steps 30 to 407) as shown in FIG. 6C. Then, the CPU 311 obtains color information corresponding to regions each having a predetermined positional relation with the marker 60 by performing the color information obtaining process, and performs processes at step 203 and subsequent steps by using the obtained color information. Then, the CPU 311 controls generation and deletion of a series of events provided to the user of the game apparatus 10, in accordance with results of a series of the processes at step 203 and subsequent steps. Examples of events provided here typically include, but are not limited to, locating a predetermined virtual object in the virtual space and/or displaying the predetermined virtual object on the display area of the game apparatus 10 (providing the virtual object in the virtual space).

Now, an example of the process of the CPU 311 obtaining the color information corresponding to the regions each having the predetermined positional relation with the marker 60 (steps 301 to 307) will be described with reference to FIG. 6C.

At step 301, the CPU 311 initializes a control parameter n for this process. Specifically, the CPU 311 sets the control parameter n to 1. The control parameter n is used for controlling reference to: the representative points Gn (n=1 to 8) having the predetermined positional relation with the marker 60; and the regions An (n=1 to 8) defined on the basis of the positions of the representative points Gn.

At step 302, the CPU 311 calculates the average of RGB values of pixels belonging to a region An (n=1 to 8). Specifically, first, the CPU 311 identifies the position of a point Gn on the basis of the position of a portion corresponding to the identified marker 60 in the obtained real space image. Next, the CPU 311 identifies a range on the real space image corresponding to the region An that is defined on the basis of the identified position of the point Gn and that has a predetermined shape and surface area. The CPU 311 obtains RGB values of pixels included in the range on the real space image, regards the average of the RGB values as the RGB average of the region An (each element in the RGB average (i.e., R, G, and B values) is provided, for example, as a value of 0.0 to 1.0), and stores the average in the main memory 32 of the game apparatus 10. After obtaining the RGB average of the region An, the CPU 311 proceeds to a process at the next step 303.

At step 303, the CPU 311 performs a process of converting the RGB average calculated at step 302 into HSV format. Specifically, the CPU 311 can accomplish this process by using a general method of converting RGB into HSV. Now, a description will be given with, as an example, the case where the values of the respective elements (hereinafter, referred to as Rn, Gn, and Bn) in the thus-obtained RGB average (of each region An) are provided as values of 0.0 to 1.0. In addition, in the following description, a variable MAX is the maximum value among the values of the elements that are compared to each other, and a variable MIN is the minimum value among the values of the elements that are compared to each other. The conversion from RGB into HSV is provided, for example, by the following relational equations. First, a hue Hn can be provided in accordance with the following three cases.

(When the variable MAX is provided as the value of Rn)

$$Hn=60\times(Gn-Bn)/(MAX-MIN)$$

(When the variable MAX is provided as the value of Gn)

$$Hn=60\times(Bn-Rn)/(MAX-MIN)+120$$

(When the variable MAX is provided as the value of Bn)

$$Hn=60\times(Rn-Gn)/(MAX-MIN)+240$$

When Hn provided by the conversion with any of the above equations is a negative value, 360 is further added to Hn to obtain a hue Hn. Next, a saturation Sn and a brightness Vn are provided by conversion with the following equations.

$$Sn=(MAX-MIN)/MAX$$

$$Vn=MAX$$

When a hue Hn, a saturation Sn, and a brightness Vn are calculated by using the above conversion equations, the hue Hn is provided as a value of 0.0 to 360.0, the saturation Sn is provided as a value of 0.0 to 1.0, and the brightness Vn is provided as a value of 0.0 to 1.0.

At step 304, the CPU 311 performs identification of the color of the region An on the basis of the result of the HSV format obtained at step 303. Here, the identification process of the color of the region An is typically a process of identifying which of predetermined specific colors (e.g., red color, blue color, green color, yellow color, and the like) the color of the region An belongs to, on the basis of information of the above HSV, and assigning the identified color as the color of the region An. However, in another embodiment, the color identification process is not limited to the typical example described above, and a process of identifying the color of the region An on the basis of only information of a predetermined color component and assigning the identified color as the color of the region An may be performed. Further, in another embodiment, as the color identification process, a process of identifying the color of the region An on the basis of a combination of information of predetermined color components and assigning the identified color as the color of the region An may be performed.

A typical example of the color identification process will be described below. Specifically, the case will be described where when the region An has a hue Hn, a saturation Sn, and a brightness Vn, it is determined, on the basis of a combination of these values, which attribute among four specific colors, "red color, green color, blue color, and yellow color", is assigned to the region An. As a matter of course, the specific colors are not necessarily four colors, and may be any number of colors.

In this example, first, the CPU 311 assumes that the saturation Sn and the brightness Vn satisfy a certain condition, and performs a process of performing identification of the above specific colors (four colors) on only regions An each of which satisfies this assumption, on the basis of the value of the hue Hn. A condition concerning saturation and brightness that is used for this assumption is that saturation Sn≥0.43 and brightness Vn≥0.125.

When the value of the hue Hn falls within a certain range, any attribute of the above four colors is assigned to the region An. Specifically, when the hue Hn is in the range of −5.0±15.0 (0.0 to 10.0 and 340.0 to 360.0), the region An has "red color", and when the hue Hn is in the range of 60±15.0, the region An has "yellow color". When the hue Hn is in the range of 120.0±60.0, the region An has "green color", and when the hue Hn is in the range of 220.0±25.0, the region An has "blue color".

In this example, the range of values corresponding to "yellow color" partially overlaps the range of values corresponding to "green color". When a value in the overlap range is provided, the CPU 311 determines as follows. Specifically, the CPU 311 determines which of reference values of these two colors (the reference value of "yellow color" is 60 and the reference value of "green color" is 120.0) the value that is a determination target is close to, and uses an attribute (i.e., "yellow color" or "green color") corresponding to the reference value closer to the determination target value, as a determination result. For example, when the hue Hn is 70, the reference value of "yellow color" is closer to the hue Hn than the other reference value, and thus the region An having this hue Hn is determined to have "yellow color". The specific ranges of values described in this example are merely examples, and in another embodiment, other ranges of values and another criterion may be used.

By the identification process being performed as described above, the following effect can be provided. Specifically, a situation can be avoided where when two colors are perceived as similar colors (e.g., both are perceived as "red color") by observation with the naked eyes of an observer (player), one of them is recognized as "red color" and the other as "blue color" through the identification process using the imaging section. Thus, a problem of confusing the user when the color identification process of the game apparatus 10 is used can be avoided.

When performing the color identification after converting the RGB information into the HSV information as described above, the CPU 311 may not perform the color identification on the basis of only the HSV information obtained through the conversion, and may perform the color identification on the basis of the HSV information as well as the RGB information that is subjected to the conversion.

For example, first, the CPU 311 performs identification of the color attribute (color components and a combination thereof) of the region An on the basis of only HSV information obtained by converting the RGB information of the region An. In addition, the CPU 311 performs identification of the color attribute of the region An on the basis of the value of each element of the RGB information of the region An that is subjected to the conversion. Then, when results of both identifications agree with each other, the CPU 311 assigns a color attribute to the region An on the basis of the agreeing results. When these results do not agree with each other, the CPU 311 does not assign any color attribute. Thus, the accuracy of the color identification can be enhanced.

The color information that is identified at step 304 and assigned as the attribute of the region An is used as a parameter for controlling events during the game processing at subsequent steps. After the process at step 304, the CPU 311 performs a process at step 305.

At step 305, from the result of the process at step 304, the CPU 311 extracts color information used for processes at step 203 and subsequent steps in the event control process (FIG. 6B) and extracts additional information as necessary. Specifically, the CPU 311 can obtain position information (a position in the real space image) of the region An, together with the color information obtained at step 304.

At step 306, the CPU 311 determines whether or not the control parameter n reaches a predetermined upper limit $n_{max}$. Specifically, for example, when eight representative points Gn for color identification of the marker 60 are provided around the marker 60 and regions An corresponding to the representative points Gn are defined as in the example shown in FIG. 4F, the upper limit $n_{max}$ of the parameter n is 8. In the present embodiment, the number of representative points defined around the marker 60 and the number of regions defined on the basis of the representative points are 8, but in another embodiment, each of these numbers may be another number.

At step 307, the CPU 311 increases the value stored as the control parameter n, by 1. Then, the CPU 311 returns to the process at step 302.

As described above, the CPU 311 performs the color information obtaining process at step 202 in FIG. 6B (a series of the processes defined at steps 301 to 307), and then performs a process at step 203 (FIG. 6B).

At step 203, the CPU 311 determines whether or not any event occurrence condition is satisfied, on the basis of a group of the color information obtained in the process at step 202. In a typical example, the game apparatus 10 previously defines a predetermined event group corresponding to color information that can be obtained in the color information obtaining process (step 202). Now, a description will be given with a more specific example. For example, five cases where (1) red color, (2) green color, (3) blue color, or (4) blue color is assigned as a color attribute to each region An, or (5) no attribute is assigned to each region An, are cases assumed concerning the color attribute of each region An. In a typical example, at the color information obtaining process (step 202), in each of the former four cases, a predetermined event is associated with each of the above specific colors. In other words, when any color attribute of the above four colors is assigned to each region An, the corresponding predetermined event occurs.

The events defined here may be any events that can be provided during the game processing. Typical examples of the events include, but are not limited to, locating a virtual object in the virtual space and/or displaying the virtual object on the display area (of the game apparatus 10) (providing the virtual object in the virtual space). More Specifically, for example, red color, green color, blue color, and yellow color that are defined as color attributes for the regions An can serve as conditions for causing a virtual object A, a virtual object B, a virtual object C, and a virtual object D, respectively, to appear in the virtual space. Here, for representation, for example, the color of the appearance of a shape model for an appearing virtual object may be caused to correspond to the color corresponding to the condition for causing this virtual object to appear (e.g., when red color is identified as the color attribute of each region An, an event of locating a red fish object is caused to correspond to the color attribute), but the events do not necessarily need to be limited to this example.

Further, in addition to the condition that each region An has predetermined color information, the event occurrence condition may be set by combining another condition. Examples of the combination with the other condition include, but are not limited to, the following conditions and combinations thereof.

For example, the CPU 311 may perform setting such that an event occurs when a predetermined number (e.g., two) or more of regions An among the regions An are identified to have the same color attribute. In this case, only presence of the predetermined number of regions An being recognized may be an event occurrence condition, but an event occurrence condition may be set by also combining the positional relation of the regions An identified to have the same color attribute and the like.

More specifically, for example, identifying that the regions An identified to have the same color attribute are located adjacently to each other along the edge of the marker 60, is considered. In another example, any two of the regions An identified to have the same color attribute may be additionally identified to be located adjacently to each other along a side of the edge of the marker 60. The CPU 311 identifies such a positional relation on the basis of the information obtained at step 305 (FIG. 6C) and the like.

When the CPU 311 identifies a first color attribute at a predetermined number or more of regions An and identifies a second color attribute different from the first color attribute, at a predetermined number or more of other regions An, the CPU 311 may perform the following process. Specifically, in such a case, the CPU 311 can perform a process of not assigning either identified color attribute to the regions An. In another example, the CPU 311 can also perform a process of preferentially assigning either one of the identified color attributes (or a third color attribute (e.g., a color attribute located between the first color attribute and the second color attribute that are compared to each other)) to all the regions An.

Further, the event occurrence condition may include a temporal element. Specifically, when regions An or a combination of color attributes thereof are recognized only in a certain image for one frame (rendering unit), the CPU 311 may not identify the color attributes of the regions An, but when regions An or a combination of color attributes thereof are recognized consecutively in images for a specific number of frames (e.g., 30 frames), the CPU 311 may determine that the event occurrence condition is satisfied. When a state where the CPU 311 recognizes a specific color attribute continues for a predetermined time (a predetermined number of frames), the CPU 311 provides an event corresponding to the color attribute, thereby accomplishing further stable provision of an event (the CPU 311 is unlikely to be influenced by errors of color identification).

Further, regarding "consecutively", in addition to the case of being completely consecutive, the case of being consecutive in a larger view even when the continuity interrupts when viewed locally (along a temporal axis) may be handled as a state of being "consecutive". For example, the following condition may be assumed with, as an example, the case where specific 31 frames are extracted. For example, the following case may be regarded as being substantially "consecutive", and the processing may be performed. The case is that the CPU 311 consecutively recognizes a predetermined color attribute at regions An in the first 15 frames, does not recognize the color attribute at the regions An in the next one frame, and assigns the same color attribute as that in the first 15 frames, in the next 15 frames.

In this manner, at step 203, the CPU 311 determines whether or not any event occurrence condition is satisfied. Then, when determining that any event occurrence condition is satisfied (Yes at step 203), the CPU 311 proceeds to a process at step 207. On the other hand, when determining that no event occurrence condition is satisfied (No at step 203), the CPU 311 proceeds to a process at step 204.

At step 204, the CPU 311 determines whether or not there is any predetermined event currently progressing. During the game processing of the game apparatus 10, a large number of events (including a wide range of variations due to differences in a timing when an event is started, a timing when an even ends, a time duration for which an event continues, a frequency in the case where an event repeatedly occurs, and the like) are managed. The CPU 311 determines whether or not any of these events is progressing at that time point. When recognizing presence of any progressing event (Yes at step 204), the CPU 311 proceeds to a process at step 205. On the other hand, when not recognizing presence of any progressing event (No at step 204), the CPU 311 proceeds to a process at step 210.

At step 205, the CPU 311 determines whether or not an event deletion condition corresponding to any currently progressing event is satisfied, on the basis of the group of the color information obtained in the process at step 202.

Specifically, the CPU 311 determines whether or not any event determined to be progressing at step 204 satisfies the corresponding event deletion condition. The event deletion condition used here is typically a condition determined on the basis of the color attributes of the regions An or a combination thereof, or a combination of the additional information different from them, which are obtained at step 202. More specifically, after causing a predetermined event to occur (e.g., causing the virtual object A to appear) in the virtual space by a certain color attribute being assigned to each region An, when the CPU 311 cannot assign the color attribute to each region An over a predetermined time (frame), the CPU 311 can delete the event from the virtual space.

Similarly to the event occurrence condition at step 203, the event deletion condition may be defined by any combination of a condition concerning the number of regions An (e.g., a condition that when the CPU 311 recognizes a color attribute at a predetermined number or more of regions An, even if the color attribute is not recognized in some regions An, the CPU 311 can regard the color attribute as being recognized), positional information of the regions An, another temporal element, and the like.

At step 206, the CPU 311 performs an inter-event adjustment process including a process of deleting the event that satisfies the event deletion condition (e.g., deleting a virtual object from the virtual space, stopping displaying of a virtual object on the display area of the game apparatus 10). Specifically, the CPU 311 performs a process of adjusting execution, timing, and the like of generation and/or deletion of a plurality of events, such that the generation and/or the deletion do not cause a dissonant result for the progress of the game processing. This can be accomplished by previously defining a process procedure for events that can be generated and deleted in parallel to each other, and by the CPU 311 performing the process so as to reflect therein the situation that changes moment by moment.

At step 207, the CPU 311 determines whether or not there is any event currently progressing. When not identifying presence of any progressing event (No at step 207), the CPU 311 proceeds to a process at step 208. On the other hand, when recognizing presence of any progressing event (Yes at step 207), the CPU 311 proceeds to a process at step 209.

At step 208, the CPU 311 performs an occurrence process of the event that satisfies the event occurrence condition at step 203 (e.g., locating a virtual object in the virtual space, displaying the virtual object on the display area of the game apparatus 10, and the like). Specifically, the CPU 311 performs the event that satisfies the event occurrence condition, at a predetermined timing.

At step 209, the CPU 311 performs an inter-event adjustment process including the occurrence process of the event that satisfies the event occurrence condition at step 203. Specifically, similarly to step 206, the inter-event adjustment process is a process of appropriately adjusting execution, timing, and the like of generation and/or deletion of a plurality of events, such that the generation and/or the deletion do not cause a dissonant result for the progress of the game processing.

At step 210, the CPU 311 determines whether or not to continue the event control process. Specifically, the CPU 311 determines whether or not to continue the event control process by determining a condition for the event that is generated or deleted at any of steps 206, 208, and 209 (e.g., a duration time for which the event occurs) or another setting in the game processing (e.g., a time that elapses from the start of the game processing). When determining to continue the event control process (Yes at step 210), the CPU 311 returns to the process at step 201. On the other hand, when determining not to continue the event control process (No at step 210), the CPU 311 ends the event control process and proceeds to a process at step 105 (FIG. 6A).

As described above, the CPU 311 performs the event control process at step 104 (a series of the processes defined at steps 201 to 210), and then performs the process at step 105 (FIG. 6A).

At step 105, the CPU 311 determines whether or not it is in a state where a fish object is caught on the cast-in fishing hook portion 62c of the fishing rod object 62 (a "state where a fish (object) is caught on the fishing hook portion"). The "state where the fish object is caught on the fishing hook portion" is a state where the fish holds a fishing hook in its mouth during fishing performed in the real environment, and is an internal state that represents a state before the fish is pulled out of the water (pulled up) and that is defined for the game processing. In an initial state or when no fish object is caught on the fishing hook portion 62c in the progress of the game processing (No at step 105), the CPU 311 performs a process at subsequent step 106. On the other hand, when the determination at step 105 is performed after the CPU 311 performs setting of a "state of being caught on the fishing hook portion" at subsequent step 109 (Yes at step 105), the CPU 311 subsequently performs a process at step 112.

At step 106, the CPU 311 determines whether or not the fishing hook portion 62c of the fishing rod object 62 is located under the water surface object 61 that is defined on the basis of the position information of the marker 60 and the like. The CPU 311 performs the determination by obtaining the coordinate of each located virtual object (e.g., the y coordinate of each object) in a predetermined coordinate system (e.g., the marker coordinate system) and comparing these coordinates. When it is determined that the fishing hook portion 62c is located under the water surface (that is, the virtual surface defined on the basis of the water surface object 61) (that is, in the space "in the water"), the CPU 311 proceeds to a process at step 107.

At step 107, the CPU 311 determines whether or not it is in a state where a fish object (a virtual object corresponding to a fish indication 63 or 64) is nibbling the fishing hook portion 62c. Here, the state where "the fish object is nibbling the fishing hook portion" is a state where it is possible to shift to a determination process of a fish pulling-up (landing) condition in a subsequent process, and is an internal state where an action of a targeted fish trying to bite a fishing hook during actual fishing is represented in the game processing.

Specifically, when the distance between the fishing hook portion 62c that has been cast under the water surface and the fish object that is a pulled-up candidate falls within a predetermined range, the CPU 311 determines that it is in the state where it is possible to perform the determination of the pulling-up condition (that is, the state where the fish object is nibbling the fishing hook portion) (Yes at step 107). While the distance between the fishing hook portion 62c and the fish object that is the pulled-up candidate falls within the predetermined range, the CPU 311 displays an image corresponding to a scene in which the fish indication corresponding to the fish object is nibbling, at regular time intervals, the fishing hook portion 62c displayed on the upper LCD 22 (through a rendering process at step 115).

It should be noted that the CPU 311 can set a condition for cancelling the state where "the fish object is nibbling the fishing hook portion", during this processing. In other words, even when the distance between the fishing hook portion 62c and the fish object falls within the predetermined range at a certain time point, if the "pulling-up condition" described below is not satisfied before a predetermined time period elapses, the CPU 311 can compulsorily cancel the internal state in the game processing as the "state where the fish object is nibbling the fishing hook portion". When the compulsory cancellation is completed, it is not determined at step 107 that it is in the "state where the fish object is nibbling the fishing hook portion" (No at step 107), and a representation in which the fish is going away is performed to the user in the rendering process at subsequent step 115. Thus, even when the state where "the fish object is nibbling the fishing hook portion" is established in the game processing, if the pulling-up condition cannot be satisfied within the predetermined time period, the user cannot pull the fish out of the water.

In the determination of the state where "the fish object is nibbling the fishing hook portion", the CPU 311 calculates the distance between the fishing hook portion 62c and the fish object that is the pulled-up candidate. Here, an exemplified method of calculating such a distance will be described, but in this connection, first, a method of displaying fish indications on the water surface object 61 will be described.

As described above, the CPU 311 displays the fish indications 63 and 64 on the water surface object 61 as shown in FIG. 4A. The shape of the water surface object 61 in the virtual space is defined by the three-dimensional model (polygon). In the present embodiment, the CPU 311 generates a superimposed image in which a water surface looks to appear in the real space, by performing mapping of an image taken by the outer imaging section 23 to the polygon. Here, the CPU 311 can represent the fish indications 63 and 64 by blending textures for indicating these fish indications and the image of the real space of which the above mapping is performed, and displaying the resultant image on the polygon.

When the fishing hook portion 62c that has been cast in the virtual space by the user performing an operation of moving the game apparatus 10 is located in the y axis negative direction in the marker coordinate system with respect to the water surface object 61 (that is, in the case of Yes at step 106), the CPU 311 calculates the distance between the fishing hook portion 62c and each fish object generated randomly by the CPU 311, or a distance regarded as being equivalent to this distance.

When the CPU 311 performs the distance calculation, it suffices that the CPU 311 obtains the position of the fishing hook portion 62c and the position at which each fish object is located, and at this stage, it is not necessarily necessary to assign a model indicating a three-dimensional shape of each fish object located there.

Specifically, in the present embodiment, until performing the process at subsequent step 112, the CPU 311 provides a representative point indicating a position in the virtual space to each fish object that is a target, and does not perform a rendering process using a three-dimensional model corresponding to each fish object. Here, FIG. 4D is referred to. FIG. 4D is a diagram schematically illustrating positional relations among the virtual objects and the virtual camera in the virtual space shown in FIG. 4A. In the example shown in FIG. 4D, the CPU 311 can randomly assign any point as a position of each fish object onto a plane $\pi 2$ (a plane that is parallel to the virtual surface $\pi 1$ and that includes a point P of the fishing hook portion 62c in the virtual space). In this example, the CPU 311 assigns points 63a and 64a as the positions at which the fish objects are to be located. As a method of assigning the position, for example, the assignment can be performed by using a set of random numbers having a predetermined distribution.

The CPU 311 represents fish indications by blending (e.g., alpha blending) a predetermined texture (e.g., a texture having a single pure color (e.g., black) or a texture in which certain shades of color are assigned in accordance with the distance between the plane π1 and the plane π2) with the taken image, which is mapped to the surface of the water surface object 61, so as to correspond to the points 63a and 64a. By so doing, the CPU 311 can provide, to the user, a representation as if fish are present under the water surface defined by the water surface object 61.

In the case of the example shown in FIG. 4D, the determination as to whether or not it is in the state where "the fish object is nibbling the fishing hook portion" is performed by determining that it is in this state, when the distance between the coordinate of the point P of the fishing hook portion 62c on the plane π2 and the point 63a or 64a falls within a predetermined range. In this example, the method in which the plane π2 is assumed is used, but the CPU 311 may perform the process at step 107 without using the plane π2. In other words, the CPU 311 may randomly define the positions of fish indications directly on the surface of the water surface object 61 located in the virtual space (or approximately on the plane π1), and then may calculate the distance between the intersection of the fishing line portion 62b and the surface of the water surface object 61 (corresponding to the point P when the plane π2 is used) and a point indicating the position of each fish indication located on the water surface object 61.

Meanwhile, a situation may occur where in the progress of the game provided by the game apparatus 10, the user largely moves the game apparatus 10 and the marker 60 deviates from the imaging range of the outer imaging section 23. However, the CPU 311 can lead the position and the orientation of the outer imaging section 23 to a state convenient for performing the marker recognition process, by limiting the positions of the fish indications displayed on the upper LCD 22 to a certain region.

Specifically, the CPU 311 can locate the fish objects such that their fish indications appear in a region between the marker 60 and the virtual camera in the virtual space or such that this tendency is increased. FIG. 4E is a schematic diagram illustrating an example of a mode in which a region (a shaded portion in the drawing) where fish indications appear is limited. The position indicated by a dotted line is the position of the marker 60. The direction indicated by an arrow in FIG. 4E is a direction to the virtual camera (the outer imaging section 23). When randomly locating the fish objects, it suffices that the CPU 311 controls this locating such that fish indications appear in the shaded region with high frequency.

Referring back to FIG. 6A, processes subsequent to step 107 will be described. When the state where "the fish object is nibbling the fishing hook portion" is established (Yes at step 107), the CPU 311 performs a process of determining whether or not it is possible to pull up the fish object (step 108).

At step 108, the CPU 311 can perform a determination of the following condition. The pulling-up condition is that (A) a moving amount of the fishing rod object 62 in the virtual space which amount is defined on the basis of the relative position of the outer imaging section 23 and the marker 60 (an amount in which an amount by which the game apparatus 10 is moved relative to the marker 60 is reflected) reaches a predetermined value, or (B) the marker 60 is not detected in the marker recognition of an image taken by the outer imaging section 23, even when the moving amount does not reach the predetermined value. When either condition is satisfied (Yes at step 108), the CPU 311 determines that it is in a state where the user pulls the fish out of the water, and proceeds to subsequent step 109. On the other hand, when the pulling-up condition is not satisfied (No at step 108), the CPU 311 performs a process of updating the positions and the orientations of the objects on the basis of an input operation performed by the user on the game apparatus 10 and the like (step 110).

The pulling-up condition (A) will be described in more detail. In accordance with the progress of the game (e.g., the state where the fish is nibbling the fishing hook), the user moves the holding game apparatus 10 (see FIG. 4A) such that its position changes relative to the marker 60 (e.g., by a motion as if pulling up). The CPU 311 can use an amount by which the fishing hook portion 62c moves in the virtual space for a predetermined time period (e.g., a one-frame time) in the game processing as a result of this operation of the user (e.g., a distance by which the fishing hook portion 62c moves in the y axis positive direction in the marker coordinate system), as a moving mount that is a determination target for the pulling-up condition.

In other words, the moving amount is obtained as a result of the operation performed by the user on the game apparatus 10. When the user moves the game apparatus 10 relative to the marker 60 by a predetermined action (an action of pulling up the game apparatus 10 for pulling the fish out of the water, with regarding the game apparatus 10 as a part of a fishing rod), the CPU 311 can assign a physical amount defining the action performed by the user in the real space, as a change amount in the virtual space (e.g., a translational moving distance of the virtual objects) on the basis of position information obtained through the marker recognition and coordinate update (step 102) and the update of the position of the virtual camera (step 103). For example, when the fishing hook portion 62c is located in the virtual space as shown in FIG. 4D and then it becomes a state where any fish object is caught on the fishing hook portion 62c, the CPU 311 can use the distance (Δy) from the plane π2 to the fishing hook portion 62c when the fishing hook portion 62c moves in the y axis positive direction as a result of an operation of the user, as the moving mount that is the determination target for the pulling-up condition.

Meanwhile, the pulling-up condition (B) is the case where even when this moving amount does not reach the predetermined value, the marker 60 is not detected in the marker recognition of an image taken by the outer imaging section 23. This condition is a condition for avoiding the case where as a result of an action performed by the user holding the game apparatus 10, even if the moving amount exceeds the predetermined value, the recognition of the marker 60 fails since the action is large.

Next, at step 109, the CPU 311 sets the internal state in the progress of the game as the state where the fish is caught on the hook. When with this setting maintained, an end condition (see subsequent step 111) such as performing an input for ending the game is not satisfied and the game processing continues, the CPU 311 determines at step 105 that it is in the "state where the fish (object) is caught on the hook (portion)" (Yes at step 105), and proceeds to step 112.

At step 111, the CPU 311 determines whether or not the end condition is satisfied. The end condition can be set according to the situation of the game processing such that the end condition is satisfied when the user performs an action assigned to an input operation on the game apparatus 10. For example, this action is the user pressing a predetermined button (e.g., the start button 14L or the power button 14F) in the game apparatus 10 and selecting end of the game processing in a menu display in which an end operation of the game processing can be selected. However, this action is not limited thereto.

At step 112, the CPU 311 locates the fish object at the tip of the hook. In the present embodiment, for example, a process of providing a specific three-dimensional model (polygon) to the fish object assumed at the position 63a in FIG. 4D is not performed in the processing prior to this step. At step 112, in order that the user feels presence of the fish similarly as an angler feels when pulling a fish out of the water, the CPU 311 locates a three-dimensional object at the tip of the fishing hook portion 62c when the fish object is pulled up. Then, the CPU 311 proceeds to next step 113.

At step 113, the CPU 311 determines whether or not it is in a state where the fish object is pulled above the water surface. At this step, the CPU 311 performs the same process as the moving amount calculation/evaluation process performed at step 108. For example, when the moving amount of the game apparatus 10 in the state immediately before this step (e.g., a moving amount along the y axis of the marker coordinate system) is equal to or higher than a predetermined value, the CPU 311 determines that "the fish object is pulled above the water surface" (Yes at step 113), and can perform a process at subsequent step 114. On the other hand, when determining at step 113 that "the fish object is not pulled above the water surface", the CPU 311 performs a process at subsequent step 110.

At step 114, the CPU 311 performs a representation indicating that the fish object is obtained. The CPU 311 performs a representation using the three-dimensional model located at step 112.

At step 115, the CPU 311 performs the rendering process. The CPU 311 displays a game image to the user in accordance with the internal state in the game processing and according to a procedure stored in a storage area of the game apparatus 10.

One Example of Effect Provided by First Embodiment

The image processing program and the like of the present invention can provide more extension of representation as the game than ever to enhance fun, by extracting the color information from the portion other than the image corresponding to the marker among the taken image of the real space, and using the color information.

As described in the exemplified embodiment, setting the positions of pixels (regions An) for identifying color information, as a specific object to be near the marker, allows a state where the color identification process is stably performed to be maintained, since an image of the surrounding of the marker is also taken when an image of the marker is taken.

As described in the exemplified embodiment, when a state where the process of identifying color information is performed continues for a predetermined time, the virtual object corresponding to the color information is provided in the virtual space. Thus, the virtual object can be prevented from unintentionally appearing due to an error of the color identification process.

As described in the exemplified embodiment, when a state where the process of identifying color information is not performed continues for a predetermined time after providing the virtual object, the virtual object is deleted. Thus, the virtual object can be prevented from unintentionally disappearing due to an error of the color identification process.

Further, according to the configuration of the exemplified present embodiment in which the above fishing game is mounted, a feeling can be provide to the user as if fish and a fishing rod are present in the real space, the fishing rod is connected to the game apparatus 10, and a line is dropped therefrom into a water surface. Thus, when the fishing game is played while the game apparatus 10 is operated, feelings such as an immersed feeling and a reality feeling can be enhanced as compared to those with a conventional game apparatus.

More specifically, in the game apparatus 10 of the present embodiment, with respect to the virtual surface (the water surface object 61) that is set on the basis of the visual marker (marker 60) for generating a superimposed image by combining a real space image and a virtual space image, the player object (the fishing rod object 62) is located in the virtual space on the virtual camera side (the space on the water), while the non-player objects (the fish objects) are located in the "space in the water" that is defined so as to be adjacent to the space on the water and separated by the virtual surface from the space on the water. In such a configuration, the user participates in the game by holding the game apparatus 10 while viewing the above superimposed image displayed on the display device (the upper LCD 22) integral to the game apparatus 10, and by performing an operation of moving the outer imaging section 23 taking an image of the marker 60, that is, the entire game apparatus 10, relative to the marker 60. Thus, feelings such as an immersed feeling and a reality feeling that are enhanced as compared to those with a conventional game apparatus can be provided to the user.

Further, in the game processing, the game apparatus 10 changes the positional relation of either of the player object or the non-player objects or both of them with respect to the virtual surface. Thus, feelings such as an immersed feeling and a reality feeling that are further enhanced can be provided to the user.

Further, as described above, the method of representing fish indications by blending a predetermined texture with a take image that is mapped to the water surface object 61 allows rendering a group of fish objects, assumed under the water surface, by using sequentially a three-dimensional model (polygon) to be avoided. Thus, a feeling that is obtained by an angler at a water's edge during fishing can be provided even while the load on the game processing is greatly reduced.

Meanwhile, in the conventional art, when fish indications for fish objects to which three-dimensional models located under a water surface are provided are represented by using transparent processing, in particular, when a superimposed image is generated with an image of the real space, it is difficult to achieve both more realistic rendering of a region having a large depth of water (e.g., a region corresponding to a sea or lake bottom and a region that incoming visible light does not reach) and seamlessly synthesizing virtual objects with a taken image of the real space. However, if the method used in the exemplified embodiment described above is used, it is easy to represent a water surface having a surface wave while rendering fish indications as necessary, even by using an opaque real space image that has not been subjected to transparent processing, without being restrained by the problems concerning rendering of a region having a large depth of water.

Modifications etc.

In the embodiments described above, the position and the orientation of the marker 60 included in the real space image are recognized, and the virtual objects are synthesized with the real space image in accordance with the recognition result. However, in another embodiment, instead of the marker 60, the position and/or the orientation of any recognition target may be recognized, and the virtual objects may be synthesized with the real space image in accordance with the recognition result. One example of the recognition target is a human face.

In the embodiments described above, the stereoscopic image is displayed on the upper LCD 22 on the basis of the real space image taken in real time by the outer imaging section 23. However, in another embodiment, a stereoscopic image may be displayed on the upper LCD 22 on the basis of data of a moving image previously taken by the outer imaging section 23, an external stereo camera, or the like.

In the embodiments described above, the outer imaging section 23 is previously mounted to the game apparatus 10. However, in another embodiment, an external camera detachable from the game apparatus 10 may be used.

In the embodiments described above, the upper LCD 22 is previously mounted to the game apparatus 10. However, in another embodiment, an external stereoscopic display detachable from the game apparatus 10 may be used.

In the embodiments described above, the virtual objects are synthesized with the real space image and displayed by using the game apparatus 10. However, in another embodiment, the virtual objects may be synthesized with the real space image and displayed by using any information processing apparatus or information processing system (e.g., a PDA (Personal Digital Assistant), a mobile phone, a personal computer, or a camera).

In the embodiments described above, the game processing is executed by using only one apparatus (the game apparatus 10). However, in another embodiment, a plurality of information processing apparatuses, included in an image display system, that can communicate with each other may share the execution of the game processing.

It should be noted that in the case where the image processing program and the like of the present invention are used on a general-purpose platform, the image processing program may be provided under the condition that a standard program module provided on the platform is used. It should be understood that even if a function corresponding to such a module as described above is excluded from the image processing program, the resultant image processing program substantially corresponds to the original image processing program as long as the module complements the excluded function.

In the embodiments described above, a video see-through technique has been described in which a camera image taken by the outer imaging section 23 and virtual objects (e.g., the water surface object 61) are superimposed on each other and displayed on the upper LCD 22. However, the present invention is not limited thereto. For example, an optical see-through technique may be implemented. In the optical see-through technique, a display device that includes at least an imaging section and that is worn at the head of the user (hereinafter, referred to as head mounted display) is used. The user wearing the head mounted display can view the real space through a display section (screen) located at a position corresponding to a lens part of eye glasses. The display section is formed from a material that allows the user to view the real space therethrough. In addition, the display section allows an image of a virtual object generated by a computer to be displayed thereon. Further, the display section includes a liquid crystal display device or the like, and is configured to display an image of a virtual object generated by a computer, on the liquid crystal display device or the like and guide light from the liquid crystal display device to the user's retina (by reflecting the light by a half mirror or the like). Thus, the user can view an image in which the image of the virtual object is optically superimposed on the real space. A camera included in the head mounted display is used for detecting a marker located in the real space. Further, as another optical see-through technique, there is a technique in which a half mirror is not used and a transmissive liquid crystal display device is laminated on the display section. The present invention may use this technique. In this case, when an image of a virtual object is displayed on the transmissive liquid crystal display device, the image of the virtual object displayed on the transmissive liquid crystal display device is superimposed on the real space viewed through the display section, and the image of the virtual object and the real space are viewed by the user.

While the invention has been described in detail, the foregoing description is in all aspects illustrative and not restrictive. It is understood that numerous other modifications and variations can be devised without departing from the scope of the invention. It should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargon and technical terms have the same meanings as those generally understood by one skilled in the art of the present invention. In the event of any conflict, the present specification (including meanings defined herein) has priority.

What is claimed is:

1. A non-transitory computer readable storage medium having an image processing program stored therein, the image processing program, when executed by a computer of an image processing apparatus which is connected to a real camera for taking an image of a real space and a display device that allows the real space to be viewed on a display area thereof, causes the computer to perform operations comprising:

obtaining an image of the real space taken as a real space image by the real camera;

detecting a specific object from the real space image;

performing at least calculation of a relative position between the real camera and the specific object on the basis of a result of the detecting;

setting a virtual camera in a virtual space on the basis of the relative position;

identifying, from pixels that constitute a portion of the real space image other than a portion thereof corresponding to the specific object, a pixel that satisfies a predetermined color condition defined on the basis of a color component of the constituting pixels or a combination thereof;

providing a predetermined event corresponding to the predetermined color condition in the virtual space in accordance with a result of the identifying, wherein the predetermined event is an event of providing an object in the virtual space, and wherein when providing the object, the object to be provided in the virtual space is selected from a plurality of objects based upon a color component of the identified pixel or a combination of color components of the identified pixel;

generating a virtual space image by taking, by the virtual camera, an image of the virtual space in which the event is provided; and displaying the virtual space image on the display device such that the virtual space image is superimposed on the real space on the display area and viewed on the display area.

2. The non-transitory computer-readable storage medium according to claim 1, wherein a region, within the real space image, in which the pixel that satisfies the predetermined color condition is identified is a region defined on the basis of a positional relationship with the portion corresponding to the specific object.

3. The non-transitory computer-readable storage medium according to claim 1, wherein a region, in the real space image, in which the pixel that satisfies the predetermined color condition is identified is a portion corresponding to a region near the specific object in the real space.

4. The non-transitory computer-readable storage medium according to claim 1, wherein
a region, within the real space image, in which the pixel that satisfies the predetermined color condition is identified includes a plurality of subregions, wherein the operations further comprise:
performing a process of identifying a pixel that satisfies the predetermined color condition, for each of the subregions; and
providing the predetermined event in the virtual space in accordance with a combination of results of the process of identifying that are obtained for the subregions, respectively.

5. The non-transitory computer-readable storage medium according to claim 4, wherein the predetermined event is provided in the virtual space in accordance with a combination of results of the identifying process when a same result of the process of identifying is obtained for at least two subregions of the plurality of subregions.

6. The non-transitory computer-readable storage medium according to claim 4, wherein, in the virtual space, the predetermined event corresponds to: at least one result of the process of identifying for each of the plurality of subregions; and position information of each of the plurality of subregions.

7. The non-transitory computer-readable storage medium according to claim 1, wherein the predetermined event in the virtual space is provided when a state where the identifying the pixel that satisfies the predetermined color condition continues for a predetermined time.

8. The non-transitory computer-readable storage medium according to claim 1, wherein after the providing, the predetermined event is deleted from the virtual space when a state where the identifying does not identify the pixel that satisfies the predetermined color condition continues for a predetermined time.

9. The non-transitory computer-readable storage medium according to claim 1, wherein the operations further comprise converting RGB color model-based color information of the portion of the real space image other than the portion thereof corresponding to the specific object, into HSV color model-based color information before identifying a pixel that satisfies a predetermined color condition, from pixels that constitute the portion of the real space image other than the portion thereof corresponding to the specific object; and identifying the pixel as being in the predetermined color condition when the result of identifying a pixel on the basis of the converted information based on the HSV color model agrees with a corresponding result of identification only based on the RGB color model-based color information.

10. An image processing apparatus connected to a real camera for taking an image of a real space and a display device that allows the real space to be viewed on a display area thereof, the image processing apparatus comprising:
at least one processor configured to perform operations comprising:
obtaining an image of the real space taken as a real space image by the real camera;
detecting a specific object from the real space image;
performing at least calculation of a relative position between the real camera and the specific object on the basis of a result of the detecting;
setting a virtual camera in a virtual space on the basis of the relative position;
identifying, from pixels that constitute a portion of the real space image other than a portion thereof corresponding to the specific object, a pixel that satisfies a predetermined color condition defined on the basis of a color component of the constituting pixels or a combination thereof;
providing a predetermined event corresponding to the predetermined color condition, in the virtual space in accordance with a result of the identifying, wherein the predetermined event is an event of providing an object in the virtual space, and wherein when providing the object, the object to be provided in the virtual space is selected from a plurality of objects based upon a color component of the identified pixel or a combination of color components of the identified pixel;
generating a virtual space image by taking, by the virtual camera, an image of the virtual space in which the event is provided; and
displaying the virtual space image on the display device such that the virtual space image is superimposed on the real space on the display area and viewed on the display area.

11. An image processing system, comprising:
a real camera for taking an image of a real space and a display device that allows the real space to be viewed on a display area thereof; and
at least one processor communicatively coupled to the real camera and configured to perform operations comprising:
obtaining an image of the real space taken as a real space image by the real camera;
detecting a specific object from the real space image;
performing at least calculation of a relative position between the real camera and the specific object on the basis of a result of the detecting;
setting a virtual camera in a virtual space on the basis of the relative position;
identifying, from pixels that constitute a portion of the real space image other than a portion thereof corresponding to the specific object, a pixel that satisfies a predetermined color condition defined on the basis of a color component of the constituting pixels or a combination thereof;
providing a predetermined event corresponding to the predetermined color condition, in the virtual space in accordance with a result of the identifying, wherein the predetermined event is an event of providing an object in the virtual space, and wherein when providing the object, the object to be provided in the virtual space is selected from a plurality of objects based upon a color component of the identified pixel or a combination of color components of the identified pixel;

generating a virtual space image by taking, by the virtual camera, an image of the virtual space in which the event is provided; and displaying the virtual space image on the display device such that the virtual space image is superimposed on the real space on the display area and viewed on the display area.

12. An image processing method executed in an image processing apparatus connected to a real camera for taking an image of a real space and a display device that allows the real space to be viewed on a display area thereof, the image processing method comprising:

obtaining an image of the real space taken as a real space image by the real camera;

detecting a specific object from the real space image;

performing at least calculation of a relative position between the real camera and the specific object on the basis of a result of the detecting;

setting a virtual camera in a virtual space on the basis of the relative position;

identifying, from pixels that constitute a portion of the real space image other than a portion thereof corresponding to the specific object, a pixel that satisfies a predetermined color condition defined on the basis of a color component of the constituting pixels or a combination thereof;

providing a predetermined event corresponding to the predetermined color condition, in the virtual space in accordance with a result of the identifying, wherein the predetermined event is an event of providing an object in the virtual space, and wherein when providing the object, the object to be provided in the virtual space is selected from a plurality of objects based upon a color component of the identified pixel or a combination of color components of the identified pixel;

generating a virtual space image by taking, by the virtual camera, an image of the virtual space in which the event is provided; and displaying the virtual space image on the display device such that the virtual space image is superimposed on the real space on the display area and viewed on the display area.

13. An image processing system connected to a real camera for taking an image of a real space and a display device that allows the real space to be viewed on a display area thereof, the image processing system comprising:

a marker of which an image can be taken by the real camera; and at least one processor communicatively coupled to the real camera and configured to perform operations comprising:

obtaining an image of the real space taken as a real space image by the real camera;

detecting a marker from the real space image;

performing at least calculation of a relative position between the real camera and the marker on the basis of a result of the detecting;

setting a virtual camera in a virtual space on the basis of the relative position;

identifying, from pixels that constitute a portion of the real space image other than a portion thereof corresponding to the marker, a pixel that satisfies a predetermined color condition defined on the basis of a color component of the constituting pixels or a combination thereof;

providing a predetermined event corresponding to the predetermined color condition, in the virtual space in accordance with a result of the identifying, wherein the predetermined event is an event of providing an object in the virtual space, and wherein when providing the object, the object to be provided in the virtual space is selected from a plurality of objects based upon a color component of the identified pixel or a combination of color components of the identified pixel;

generating a virtual space image by taking, by the virtual camera, an image of the virtual space in which the event is provided; and displaying the virtual space image on the display device such that the virtual space image is superimposed on the real space on the display area and viewed on the display area.

* * * * *

UNITED STATES PATENT AND TRADEMARK OFFICE
CERTIFICATE OF CORRECTION

PATENT NO. : 8,797,354 B2  
APPLICATION NO. : 13/159767  
DATED : August 5, 2014  
INVENTOR(S) : Noge Page 1 of 1

It is certified that error appears in the above-identified patent and that said Letters Patent is hereby corrected as shown below:

Title page, change "(73) Assignees: Nintendo Co., Ltd., Kyoto (JP); Hal Laboratory, Tokyo (JP)" to -- (73) Assignees: Nintendo Co., Ltd., Kyoto (JP); HAL Laboratory Inc., Tokyo (JP) --

Signed and Sealed this  
Twenty-seventh Day of October, 2015

Michelle K. Lee  
*Director of the United States Patent and Trademark Office*